(12) United States Patent
Weinberg et al.

(10) Patent No.: US 10,341,856 B2
(45) Date of Patent: Jul. 2, 2019

(54) SYSTEM AND METHOD FOR SECURING COMMUNICATION AND INFORMATION OF MOBILE DEVICES THROUGH A CONTROLLED CELLULAR COMMUNICATION NETWORK

(71) Applicant: FirstPoint Mobile Guard Ltd., Gealya (IL)

(72) Inventors: Adam Weinberg, Netanya (IL); Dror Fixler, Ganei-Tikva (IL); Achiel Krauz, Tel-Aviv (IL)

(73) Assignee: FIRSTPOINT MOBILE GUARD LTD., Gealya (IL)

( * ) Notice: Subject to any disclaimer, the term of this patent is extended or adjusted under 35 U.S.C. 154(b) by 77 days.

(21) Appl. No.: 15/591,717

(22) Filed: May 10, 2017

(65) Prior Publication Data
US 2017/0332232 A1 Nov. 16, 2017

Related U.S. Application Data

(60) Provisional application No. 62/333,973, filed on May 10, 2016.

(51) Int. Cl.
*H04W 12/02* (2009.01)
*H04W 12/12* (2009.01)
(Continued)

(52) U.S. Cl.
CPC .............. *H04W 12/02* (2013.01); *H04W 4/14* (2013.01); *H04L 63/1441* (2013.01);
(Continued)

(58) Field of Classification Search
CPC ....... H04W 12/02; H04W 12/12; H04W 4/14; H04W 84/042; H04W 63/1416; H04W 63/1441; H04W 63/145; H04W 63/1466
See application file for complete search history.

(56) References Cited

U.S. PATENT DOCUMENTS 9,516,053 B1* 12/2016 Muddu ............... H04L 63/1425
2007/0173252 A1* 7/2007 Jiang .................. H04W 8/04
455/432.1
(Continued)

OTHER PUBLICATIONS

Subramaniam et al, A Review on DDoS Prevention and Detection Methodology, International Journal of Ambient Systems and Applications, vol. 3 Sep. 2015 (Year: 2015).*
(Continued)

*Primary Examiner* — George Eng
*Assistant Examiner* — Hung K Du
(74) *Attorney, Agent, or Firm* — Browdy and Neimark, P.L.L.C.

(57) ABSTRACT

The present invention discloses a system and a method for securing the privacy of cellular network subscribers and the security of data stored on the said subscribers' User Cellular Devices (UCDs). The system comprises a Controlled Cellular Network (CCN), interfacing a cellular Public Land Mobile Network (PLMN), hosting a plurality of cellular subscribers. The said CCN system provides said security services to "serviced subscribers" of the hosting PLMN. The CCN encapsulates communication between UCDs of serviced subscribers and the hosting PLMN, including at least part of: control, signaling, SMS and data communications. The CCN is configured to identify security threats to the privacy of serviced subscribers and to the data stored on their UCDs, and determine said threats' category and probability, based on analysis of said encapsulated communication. CCN is configured to respond to said threats in real or near-real time, and take active measures to avert said suspected threats.

25 Claims, 14 Drawing Sheets

(51) Int. Cl.
*H04W 4/14* (2009.01)
*H04W 84/04* (2009.01)
*H04L 29/06* (2006.01)

(52) U.S. Cl.
CPC ......... *H04L 63/1466* (2013.01); *H04W 12/12* (2013.01); *H04W 84/042* (2013.01)

(56) References Cited

U.S. PATENT DOCUMENTS

| | | | |
|---|---|---|---|
| 2010/0234003 A1* | 9/2010 | Theppasandra ... | H04M 3/42195 455/415 |
| 2016/0226913 A1 | 8/2016 | Sood et al. | |
| 2016/0308837 A1 | 10/2016 | Baliga et al. | |
| 2016/0337390 A1* | 11/2016 | Sridhara ............... | G06F 3/0484 |

OTHER PUBLICATIONS

Vic Hargrave, What Are Computer Worms and HOw Can I Protect Myself From Them, https://blog.trendmicro.com, Nov. 14, 2012 (Year: 2012).*

Anritsu, MMS (Multimedia Messageing Service) Application Note, Aug. 2007 (Year: 2007).*

* cited by examiner

Probe interface module 1300

| Interfacing and managing the probing of each of the controlled modules within the controlled environment. 1310 |
| Optionally managing the probing of events and transactions according to instructions from the data analysis module [1400]. |
| Optionally obtaining data regarding events and transactions on the hosting PLMN 200 network from dedicated probing modules, implemented and deployed within the PLMN 200 environment. |
| Obtaining Voice call's control messages by probing the controlled GMSC [300] and controlled MME [350] modules 1320 |
| Obtaining packet switching information between the CCN [100] and the HPLMN by probing the controlled GGSN and controlled PGW modules, as well as external packet switched networks such as the Internet, IoT (Internet of things), M2M (Machine to Machine) and connected cars networks 1330 |
| Obtaining SMS control and data information by probing the controlled SMSC [400] module. 1340 |
| Probing access events to the controlled HLR and controlled HSS from the HPLMN, and logging changed entries to the controlled HLR [800] and controlled HSS [850] databases 1350 |
| Propagating accumulated information to data analysis module [1400] 1360 |

Fig 6

Data analysis module  1400

| | |
|---|---|
| Obtaining data from the probe interface module 1300. | 1410 |
| Keeping track of all events that have been recorded by the probe interface 1300 in the events database 1100a. This database serves to analyze network scenarios according to strings of events, as well as singular event occurrences. | 1420 |
| Analyzing communication destination, timing patterns and statistics. Identifying statistic deviations that exceed pre-defined thresholds (e.g. messages recurring beyond a predefined frequency). | 1430 |
| Analyzing communication volume and statistics. Identifying data volume deviations that exceed pre-defined thresholds. | 1440 |
| Analyzing content and context of packet-switched messages, to identify:<br>• relation to URLs and IPs that are labeled as blacklisted or grey-listed according to the threats database. Invoking end-point verification (whois) if necessary.<br>• DNS address changes on the UCD to prevent traffic redirection to MitM sites. Invoking end-point verification (whois) if necessary.<br>• upload of sensitive information, or by IP address only (no hostname).<br>• download of data that is labeled as malicious (e.g.: Viruses, Spyware, Malware) according to the threats database. | 1450 |
| Optionally employing machine learning algorithms to ascertain which web sites are likely or unlikely for specific users to visit, according to their surfing history and user profile. This facilitates the identification of exceptional content, significantly different than known types of content viewed by the user   1460 | |
| Analyzing the content and context of SMS / MMS / EMS messages to identify:<br>• suspicious scenarios (e.g. TMSI followed by SMS messages)<br>• malicious contents (e.g. silent, incomplete or empty SMS message, link to blacklisted site)<br>• spoofed SMS sender address | 1470 |

Fig 7

Data analysis module [1400] – continued

---

Analyzing content and context of voice call control messages (SS7, [210]), to identify suspicious scenarios, for example: 1480
- Receiving a SIM notification regarding switching of cellular communication to 2G (GSM) protocol;
- Receiving a SIM notification regarding communication encryption deactivation;
- Receiving an ATI (Any Time Interrogation) query, followed by an SMS message;
- Receiving an IMSI identification request, not within the UCD registration process;
- A change in the access point settings, such as APN, MMSC;
- A change in the serving cell ID (CID), that is inconsistent with the BTS physical location or the UCD physical location;
- Unexpected requests for execution of UCD authentication procedures against the HPLMN [200] Authentication Center (AUC).

---

Analyzing events surrounding the UCD connection to a WiFi network to identify suspicious scenarios, for example: 1490
- Tracking the history of visited websites throughout the period of UCD connection to the WiFi network;
- Detecting suspicious connection to a WiFi network that bears an identical name to a different WiFi network already resident in the UCD list of known networks;
- Detecting suspicious actions, e.g.: surfing a blacklisted site, uploading streaming video or data stored on the UCD, capturing a screen image, or operating the UCD microphone.

---

Employing the HLR analyzing sub-module [1400b], to analyze access of the HPLMN to the controlled HLR [800] or controlled HSS [850] modules, and identify suspicious scenarios, for example: 1500
- call handover between physically inconsistent BTS
- unexpected Inter-RAT (IRAT) call handovers

Fig 8

Data analysis module [1400] – continued (Actions)

| |
|---|
| Determining the existence of a security threat, its type and probability, according to the different methods of threat analysis, as elaborated above. The said determination takes into account:<br>- the events and threats that have been accumulated by the CCN [100] on its respective databases; and<br>- the profile of threat analysis and suspicious scenarios, as predefined via the administrative module.    1510 |
| Optionally updating the profile of threat analysis, according to newly identified security threats.    1520 |
| Determining security measures to be invoked in response to the said determined security threat type and probability, and emitting a respective activity message to the security action management module 1600. The determination of security measures takes into account:    1530<br>- The category and probability of the determined security threat; and<br>- The profile of service entitlements per each subscriber. |
| Emitting activity messages to the security action management module 1600, in response to detection of a security threat related to voice call control data. This may invoke action by the controlled GMSC [300] and controlled MME [350] components.    1540 |
| Emitting determined activity messages to the security action management module 1600, in response to SMS / MMS / EMS related threat identification. This may invoke action by the controlled SMSC [400] component.    1550 |
| Emitting determined activity messages to the security action management module 1600, in response to switched-packet related threat identification. This may invoke action by the controlled PGW [550] and controlled GGSN [500] components.    1560 |
| Emitting determined activity messages to the security action management module 1600 and to the Identity mediation function module, in response to suspected network-based attacks such as location tracking attacks or Man-In-The-Middle attacks. This may invoke action by the controlled HLR, controlled HSS, and identity mediation modules.    1570 |
| Notifying the Threats management module [1800] regarding suspicious URLs, IPs, Voice & Message sender addresses. The Threats management module will maintain the Threats database [1100c] of such suspected items for further use.    1580 |
| Maintain a log of all events and conditions met during the data analysis process    1590 |

Fig 9

Security action management module [1600]

Receiving action messages from the data analysis module 1400, following identification of a suspected threat. This message contains the security measurements to be taken such as blocking, diverting, logging or alerting, and is based on the identified threat categories and their probability, and the profile of service entitlements per each subscriber          1610

Accessing the Subscribers' database [1100b] to ascertain whether the specific subscriber is entitled for the required security service, according to their profile of service entitlements.          1620

Employing the controlled GMSC [300] or controlled MME [350]for blocking or manipulating suspicious call communication transactions          1630

Employing the controlled GGSN [500] or controlled PGW [550] for manipulating suspicious data communication transactions, for example:
- blocking download of suspicious data
- blocking upload of data stored on the UCD, or originated from the UCD (e.g. video stream)
- executing end-point verification (whois) network commands          1640

Employing the controlled SMSC [400] module for blocking or manipulating suspicious SMS / EMS / MMS / USSD communication transactions          1650

Employing the controlled HLR [800] and controlled HSS [850] modules to apply actions such as:
- change the controlled network's HSS and HLR databases.
- block incoming voice calls,
- provide fabricated ATI responses to mislead tracking attempts.          1660

Maintaining a continuous communication channel between the UCD and the CCN [100] ("Lifeline"), in order to identify hijacking attempts of the UCD to another network. This communication is implemented as switched packet data, with SMS based communication fallback.          1670

Issue alerts to the administrative module 700, elaborating conditions and scenarios which have been identified as suspicious, and measures that have been taken to avert these suspected threats          1680

Fig 11

Administrative module 700

| Providing an interface for configuring the CCN [100] system. | 710 |

Providing an interface to configure the profile of hosting network [200] subscribers, for which the CCN [100] provides security services. 720

This profile incorporates various properties, such as:
• The number and identity of organizational accounts that incorporate multiple subscribers;
• The identity of individual PLMN [200] cellular subscribers, incorporated within each organizational account;
• Authorization levels that are attributed to the CCN [100] per each organizational account; and
• The profile of each subscriber's service entitlements and threat analysis (e.g.: security measures to be taken in response to identified threats).

Providing an interface to configure various properties of the CCN [100], such as: 730
• The profile of suspicious scenarios and threat analysis; and
• The instantiation of various CCN [100] modules

| Providing an interface to set up and receive alerts regarding events and actions that have taken place within the CCN [100]. | 740 |

Providing an interface for monitoring and editing the data resident on the system's databases (i.e. the events DB, subscribers DB and threats DB). For example: 750
• change the content of a specific subscriber's SISE (e.g. change identity parameters stored on the SIM card);
• add or edit specific threats within the treats database.

| Providing an interface for producing reports regarding events, subscribers and threats that are defined within the CCN [100]. | 760 |

Fig 14

SYSTEM AND METHOD FOR SECURING COMMUNICATION AND INFORMATION OF MOBILE DEVICES THROUGH A CONTROLLED CELLULAR COMMUNICATION NETWORK

FIELD OF THE INVENTION

The present invention generally relates to the field of cellular networks. More specifically, it addresses issues of communication and data security and privacy over cellular networks.

BACKGROUND OF THE INVENTION

The abundance and diversity of threats to security and privacy over cellular networks is a well-established fact. Perpetrators may tap into various sources of data that are either stored on or communicated with any cellular device. For example, they may violate the privacy of cellular network subscribers by gaining access to stored files and private information, remotely operating the cellular device's camera and microphone, implanting malicious software, and even obtaining knowledge of their physical whereabouts.

Mobile phones as well as other portable devices that are employed for business use typically posses a wide variety of communication interfaces, each of which is vulnerable to cyber attacks. Examples for such interfaces are:
  Voice calls;
  Text messages;
  Private emails and company emails;
  Private apps, and company apps;
  Access to company databases, business calendars and customer data; and
  Any type of media including IP.

Attackers may choose to hack data pertaining to a cellular subscriber through a variety of methods. Examples for such methods include:
  International Mobile Subscriber Identity (IMSI) catcher;
  Man-in-the-middle (MitM) attacks;
  Network attacks, e.g. by exploiting Signaling System 7 (SS7) loopholes; and
  Different types of social engineering methods, for the purpose of information gathering, fraud, or gaining system access.

Attackers may choose to interface the target User Cellular Device (UCD) through a variety of access points, e.g. through the cellular network, Wi-Fi, Bluetooth or a USB connection.

Attackers may choose to target 'ordinary' cellular network interfacing devices (e.g. smartphones, tablets and laptop computers) as well as Internet of Things (IoT) devices, such as Machine to Machine (M2M) and connected cars.

Attackers may choose to target personal information stored on cellular devices (e.g. passwords), in order to ultimately target data that is stored elsewhere (e.g. email or drop-box accounts).

Prior art includes tools that provide some degree of security by monitoring the activity on the UCD from the end-users' perspective, such as various anti-malware software tools. Such tools are limited in their scope of response to threats:
  They require installation of the security tool on the UCD, and rely on updates from external sources;
  They do not relate to threats posed to the UCD from the cellular network's perspective; and
  They do not control the interaction of cellular subscribers with the hosting network.

Some network security solutions (e.g. US2016226913: "Technologies For Scalable Security Architecture Of Virtualized Network" and US20160308837: "Methods And Apparatus To Configure Virtual Private Mobile Networks For Security") disclose methods for securing the functionality of modules of the cellular network, but do not directly address UCD data security and the privacy of cellular network subscribers.

The disclosed invention addresses the issue of cellular security in a comprehensive perspective, addressing threats of multiple categories and sources, from both the UCD's and the network's perspective.

SUMMARY OF THE INVENTION

The present invention discloses a system for providing security services, for securing the privacy of cellular network subscribers and the security of data stored on the said subscribers' User Cellular Devices (UCDs), said system comprising:
  at least one non-transitory computer readable storage device and one or more processors operatively coupled to the storage device on which are stored modules of instruction code which when executed by said one or more processors implements a Controlled Cellular Network (CCN), interfacing a cellular Public Land Mobile Network (PLMN), said PLMN hosting a plurality of cellular subscribers;
  wherein said CCN provides said security services to "serviced subscribers";
  wherein said CCN encapsulates communication between UCD of said serviced subscribers and the hosting PLMN, said communication including at least part of: control, signaling, SMS and data communications;
  wherein said CCN is configured to monitor and analyze parameters and characteristics of said encapsulated communication in real time or in relation to historically acquired data, including at least one of: time patterns, volumes, destination address, source address, content and context
  wherein said CCN is configured to identify statistic deviations exceeding predefined thresholds, based on said analysis of parameters and characteristics of said encapsulated communication;
  wherein said CCN is configured to identify the occurrence of predefined suspicious events and scenarios, based on said analysis of said encapsulated communication;
  wherein said CCN is configured to identify security threats to the privacy of said serviced subscribers and to the data stored on their UCD and determine said threats' category and probability, based on said analysis of encapsulated communication;
  wherein the said CCN is configured to respond to said security threats in real time or in near-real time and take active measures to avert the said suspected threats;
  wherein said active measures including at least one of: blocking or diverting communication, alerting serviced subscribers and/or system administrators, responding to system queries with altered data, and logging of suspicious events and scenarios;
  wherein application of said active measures depends on the category of identified security threat, the identified threat's probability, and the serviced subscriber's profile.

The CCN provides serviced subscribers UCDs at least part of the following functionality:
  Mobility Management (MM) of the user;
  Short Message Services (SMS);
  Supplementary Services (SS);
  Intelligent Networks (IN) aspects;
  Handling of user data communication;
  Signaling of incoming calls and SMS;
  Incoming and outgoing USSD; and
  All CAMEL transactions.

According to some embodiments, the CCN comprises at least one of:
  controlled module(s) (300, 350, 400, 500, 550, 800, 850), configured to complement the functionality of respective elements of the hosting cellular PLMN;
  a security center module (1000), configured to perform at least one of instantiation, configuration, monitoring, analysis and management of the functionality of each of said controlled modules; and
  an administrative module, configured to interface said security center module (1000), and provide an administrator interface for at least one of:
    instantiating controlled modules of one or more CCNs;
    configuring said controlled modules of said one or more CCNs, to serve serviced subscribers of the hosting cellular PLMN;
    presenting alerts regarding the functionality of the CCN and events within the hosting cellular PLMN;
    extracting reports regarding the functionality of the CCN and events within the hosting cellular PLMN.

According to some embodiments, the said at least one controlled modules comprises a controlled Home Location Register (HLR) module (800) and/or controlled Home Subscriber Server (HSS) module (850), configured, monitored and controlled by the said security center module (1000), to perform at least one of the following:
  withholding a database upon which information pertaining to said serviced subscribers is kept;
  respectively complementing the functionality of HLR and/or HSS modules of the hosting cellular PLMN system (200) from within the CCN (100);
  providing data to the security center module (1000) regarding system access to the HSS/HLR databases, Any Time Interrogation (ATI) queries and Send Routing Information (SRI) queries; and
  acting upon commands from the security center module (1000) by performing at least one of: applying changes to the CCN's HSS and HLR databases, blocking incoming messages and voice calls, and providing altered responses to ATI and SRI system queries.

According to some embodiments, the said at least one controlled modules (300, 350, 400, 500, 550, 800, 850) comprises a controlled GMSC (300) and/or controlled MME module (350), configured, monitored and controlled by the said security center module (1000), to perform at least one of the following:
  respectively complementing the functionality of GMSC (Gateway Mobile Switching Center) and/or MME (Mobility Management Entity) modules of the hosting cellular PLMN (200) from within the CCN (100);
  routing cellular calls between serviced subscribers of the CCN (100) and the hosting PLMN (200);
  providing data to the security center module (1000) regarding hosting PLMN (200) control messages; and
  acting upon commands from the security center module (1000) by blocking suspicious voice-call related messages.

According to some embodiments, the said at least one controlled modules (300, 350, 400, 500, 550, 800, 850) comprises a controlled GGSN module (500) and/or controlled PGW (550) module, configured, monitored and controlled by the said security center module (1000), to perform at least one of the following:
  respectively complementing the functionality of GGSN (Gateway GPRS Support Node) and/or PGW (Packet Data Network Gateway) modules of the hosting cellular PLMN system (200) from within the CCN (100);
  routing packet switched data between the CCN (100) and external packet switched networks, including at least one of the Internet (220), IoT (Internet of Things) devices, M2M networks and connected cars data networks;
  providing data to the security center module (1000) regarding switched data packets transactions over the PLMN (200); and
  acting upon commands from the security center module (1000) by performing at least one of: blocking the download of suspicious data, blocking the upload of data stored on the UCD, or originated from the UCD, the UCD camera and the UCD microphone, and executing an end-point verification ('whois') network command.

According to some embodiments, the said at least one controlled modules (300, 350, 400, 500, 550, 800, 850) comprises a controlled Short Messaging Service Center (SMSC) module (400), configured, monitored and controlled by the said security center module (1000), to perform at least one of the following:
  complementing the functionality of the SMSC module of the hosting cellular PLMN system (200) from within the CCN (100);
  routing Short Messages (SMS, EMS, MMS, USSD) between the CCN (100) and the hosting PLMN (200);
  providing data to the security center module (1000) regarding Short Messaging (SMS, EMS, MMS, USSD) control and data messages over the PLMN (200); and
  acting upon commands from the security center module (1000) by blocking or manipulating suspicious SMS, EMS, MMS and USSD communication transactions.

According to some embodiments, at least one component of the CCN (100) is implemented as a service, and executed on the same physical machines as the home PLMN or hosting PLMN hardware components.

According to some embodiments, the said security center module (1000) comprises at least one of the following modules:
  a probe interface module (1300), configured to probe each of the said controlled modules (300, 350, 400, 500, 550, 800, 850) within the CCN, and accumulate data regarding transactions, events and scenarios occurring on the hosing PLMN and data regarding communication between elements of the CCN and the hosting PLMN;
  a data analysis module (1400), configured to perform at least one of:
    obtaining the data accumulated by the said probe interface module (1300);
    analyzing parameters and characteristics of said encapsulated communication in real time or in near-real time, including at least one of: time patterns, volumes, destination address, source address, content and context, and identifying statistic deviations exceeding predefined thresholds;

analyzing accumulated historical data, pertaining to parameters and characteristics of said encapsulated communication;

identifying the occurrence of predefined suspicious events and scenarios on the hosing PLMN based on said analysis;

identifying security threats to the privacy of serviced subscribers and data stored on their UCD based on said analysis;

emitting activity messages to other controlled modules of the CCN to avert the said identified security threats, and emitting alert messages to said administrative module and/or UCD to notify against said identified security threats;

maintaining an events' database (1100a);

a security action management module (1600) configured to perform at least one of:

receiving activity messages from the data analysis module (1400);

obtaining parameters of served subscriber's profile from a subscribers database (1100b);

interfacing and commanding controlled modules (300, 350, 400, 500, 550, 800, 850) within the CCN to carry out security actions that are required to avert the said identified security threat, according to the category of identified threat, the identified threat's probability, and the serviced subscriber's profile;

and a threats management module (1800), configured to manage and maintain a database (1100c) of the security threats encountered during the activity of the CCN (100).

According to some embodiments, the data analysis module (1400) is further configured to:

monitor incoming and outgoing communication pertaining to specific mobile applications executing on the UCD;

detect significant deviations in said communication from expected communication patterns of said specific mobile applications, wherein said communication patterns include at least one of: source address, destination address, communication volume, communication patterns and communication timing; and analyze said detected deviations to identify illegitimate activity of mobile applications.

According to some embodiments, the system further comprises a UCD Lifeline Module (ULM (20)) embedded within said serviced subscribers' UCD (10), on which are stored modules of instruction code, which when executed by the ULM (20), configure the UCD (10) to initiate lifeline communication to the security action management module (1600) or respond to lifeline communication from the security action management module (1600).

According to some embodiments:

the said security action management module (1600) is configured to initiate lifeline communication to the UCD or respond to lifeline communication from the UCD;

failure of reception of Lifeline communication on the security action management module (1600) side is reported to the data analysis module (1400) as real-time indication of an attempt to hijack the UCD from the hosting PLMN; and failure of reception of Lifeline communication on the ULM (20) invokes security actions on the UCD side, said actions including at least one of: alerting the user regarding failure of lifeline reception and altering at least one of the UCD's identity parameters.

According to some embodiments:

said ULM is configured to send to the said security action management module (1600) real-time information regarding the status and whereabouts of the UCD through the Lifeline communication channel, said information including at least one of: properties of the hosting PLMN, events of IRAT handover during voice calls, and events of BTS handover during voice calls;

said real-time information is propagated from the security action management module (1600) to the data analysis module (1400); and the data analysis module (1400) is configured to analyze said information, and identify at least one of following suspicious events and scenarios:

illegitimate IRAT handover;

illegitimate BTS handover;

hijacking attempts of the UCD from its home PLMN (200) or visited PLMN (200b) to other networks; and illegitimate altering of UCD communication encryption properties.

According to some embodiments:

said security center module (1000) further comprises an identity mediation module (1700), configured to dynamically alter the value of one or more serviced subscribers' UCD (10) identity parameters, said identity parameters including at least one of IMSI, IMEI, IMEISV, MSISDN, Ki, Kc, TMSI, PTMSI, TLLI, ESN;

said identity mediation module (1700) communicates the said alteration of identity parameter values through said Lifeline communication channel to the ULM (20) on the serviced subscribers' UCD;

said ULM (20) module is configured to receive said required alteration of identity parameter values through said lifeline communication channel;

said ULM module (20) is configured to propagate required alteration of values of identity parameters stored on the the Subscriber Identity Storage Element (SISE (30)), to said SISE (30), said parameters including at least one of IMSI, Ki and Kc;

said SISE (30) is configured to apply said required alteration of values to identity parameter stored on the SISE (30), said parameters including at least one of IMSI, Ki and Kc;

said ULM (20) module is configured to apply changes to values of UCD (10) identity parameter stored on the UCD; and said identity mediation module (1700) is configured to dynamically mediate between said altered UCD identity parameter values and the original UCD identity parameters, thus facilitating the routing of the UCD communication with the hosting PLMN (200) or visited network (200b) using the altered identity parameters.

According to some embodiments, said alteration of one or more UCD identity parameter values may be invoked:

according to a time based trigger;

locally on the UCD (10), according to any logic preconfigured on the ULM (20) or SISE (30);

locally by the ULM (20) or SISE (30), in response to a failure to receive Lifeline communication;

remotely, according to any logic preconfigured on the identity mediation module (1700);

remotely by the identity mediation module (1700), in response to failure to receive Lifeline communication;

remotely by the identity mediation module (1700), in response to an event on the hosting PLMN (200);

remotely by the identity mediation module (1700), in response to an activity message from the data analysis module, following an identified suspected threat, including IMSI catcher and Man-in-the-Middle (MitM) attacks; or any combination of the above.

According to some embodiments, serviced subscribers' ULMs (20) are configured to possess a set of fallback identity parameter values, whereupon the event of a lifeline communication failure between the security action module (1600) and the ULM of a serviced subscriber's UCD:
- the ULM will invoke an alteration of UCD identity parameters to the said fallback values;
- the UCD will revert to using said set of fallback parameter values; and
- the ULM will optionally restart the UCD.

The UCD will thus be re-introduced to the CCN (100) bearing the said fallback identity parameter values.

The present invention further discloses a method for providing security services, for securing the privacy of cellular network subscribers and the security of data stored on the said subscribers' User Cellular Devices (UCDs), said method implemented by one or more processors operatively coupled to a non-transitory computer readable storage device, on which are stored modules of instruction code that when executed cause the one or more processors to perform:
- interfacing a cellular Public Land Mobile Network (PLMN) hosting a plurality of cellular subscribers, with a Controlled Cellular Network (CCN),
- providing security services to "serviced subscribers" by said CCN;
- encapsulating communication between the UCDs of said serviced subscribers and hosting PLMN by said CCN, said communication including at least part of: control, signaling, SMS and data communications;
- monitoring and analyzing parameters and characteristics of said encapsulated communication in real time or in relation to historically acquired data by the CCN, said parameters and characteristics including at least one of: time patterns, volumes, destination address, source address, content and context, and
- identifying by the CCN statistic deviations in said parameters and characteristics exceeding predefined thresholds, based on said analysis of said encapsulated communication.
- identifying by the CCN occurrence of predefined suspicious events and scenarios, based on said analysis of said encapsulated communication;
- identifying by the CCN security threats to the privacy of said serviced subscribers, and to the data stored on their UCDs, and determining said threats' category and probability, based on said analysis of encapsulated communication;
- responding to said security threats in real time or in near-real time, and taking active measures to avert the said suspected threats, said active measures including at least one of: blocking or diverting communication, alerting serviced subscribers and/or system administrators, responding to system queries with altered data, and logging of suspicious events and scenarios;
- wherein application of said active measures depends on the category of identified threat, the identified threat's probability, and the serviced subscriber's profile.

According to some embodiments, the method further provides serviced subscribers UCDs at least part of the following functionality by the CCN:
- Mobility Management (MM) of the user;
- Short Message Services (SMS);
- Supplementary Services (SS);
- Intelligent Networks (IN) aspects;
- Handling of user data communication;
- Signaling of incoming calls and SMS;
- Incoming and outgoing USSD; and
- All CAMEL transactions.

According to some embodiments, the said method further comprises the steps of:
- instantiating at least one controlled module (300, 350, 400, 500, 550, 800, 850), within the CCN, configured to complement the functionality of respective elements of the hosting cellular PLMN;
- configuring said controlled modules by a security center module (1000);
- monitoring, analyzing and managing of the functionality of each of said controlled modules comprising the CCN by the said security center module (1000); and
- providing an administrative interface, by means of an administrative module (700) operatively coupled to said security center module (1000), enabling an administrator to:
  - instantiate controlled modules of one or more CCNs;
  - configure the components of one or more CCNs to serve serviced subscribers of the hosting cellular PLMN;
  - presenting alerts regarding the functionality of the CCN and its components;
  - presenting alerts regarding the occurrence of events and scenarios within the hosting cellular PLMN; and
  - extracting reports regarding the functionality of the CCN and events within the hosting cellular PLMN.

According to some embodiments, the method further comprises the steps of:
- instantiating a controlled Home Location Register (HLR) module (800) and/or controlled Home Subscriber Server (HSS) module (850), configured, monitored and controlled by the said security center module (1000);
- maintaining by said controlled HLR (800) and/or controlled HSS (850) module a database upon which information pertaining to said serviced subscribers is kept;
- complementing the functionality of HLR (Home Location Register) and/or HSS (Home Subscriber Server) modules of the hosting cellular PLMN system (200) from within the CCN (100), respectively by said controlled HLR (800) and/or controlled HSS (850) module;
- providing data to the security center module (1000) regarding system access to the HSS/HLR databases, ATI queries and SRI queries by said controlled HLR (800) and/or controlled HSS (850) module; and
- acting upon commands from the security center module (1000) by said controlled HLR (800) and/or controlled HSS (850) module, by performing at least one of:
  - applying changes to the CCN's HSS and HLR databases; blocking incoming messages and voice calls; and
  - providing altered responses to Any Time Interrogation (ATI) and Send Routing Information (SRI) system queries.

According to some embodiments, the method further comprises the steps of:
- instantiating a controlled Gateway Mobile Switching Center (GMSC) module (300), and/or controlled Mobility Management Entity module (MME) module (350), configured, monitored and controlled by the said security center module (1000);

complementing the functionality of GMSC and/or MME modules of the hosting cellular PLMN (200) from within the CCN (100), respectively by said controlled GSMC module and/or controlled MME module;

routing cellular calls between serviced subscribers of the CCN (100) and the hosting PLMN (200) by said controlled GSMC module and/or controlled MME module;

providing data to the security center module (1000) regarding hosting PLMN (200) control messages by said controlled GSMC module and/or controlled MME module; and blocking suspicious voice-call related messages by said controlled GSMC module and/or controlled MME module, upon commands from the security center module (1000).

According to some embodiments, the method further comprises the steps of:

instantiating a controlled Gateway GPRS Support Node (GGSN) module (500) and/or controlled Packet Data Network Gateway (PGW) module (550), configured, monitored and controlled by the said security center module (1000);

complementing the functionality of GGSN and/or PGW modules of the hosting cellular PLMN system (200) from within the CCN (100), respectively by the said controlled GGSN module and/or controlled PGW module;

routing packet switched data between the CCN (100) and external packet switched networks, including at least one of the Internet (220), IoT (Internet of Things) devices M2M (Machine to Machine) networks and connected cars data networks by the said controlled GGSN module and/or controlled PGW module;

providing data to the security center module (1000) regarding switched data packets transactions over the PLMN (200) by the said controlled GGSN module and/or controlled PGW module; and acting upon commands from the security center module (1000) by the said controlled GGSN module and/or controlled PGW module, by performing at least one of:
blocking the download of suspicious data;
blocking the upload of data stored on the UCD, or originated from the UCD, the UCD camera and the UCD microphone; and
executing an end-point verification ('whois') network command.

According to some embodiments, the method further comprises the steps of:

instantiating a controlled Short Messaging Service Center (SMSC) module (400), configured, monitored and controlled by the said security center module (1000);

complementing the functionality of the SMSC of the hosting cellular PLMN system (200) from within the CCN (100) by the said controlled SMSC module (400);

routing Short Messages (SMS, EMS, MMS, USSD) between the CCN (100) and the hosting PLMN (200) by the said controlled SMSC module (400);

providing data to the security center module (1000) regarding Short Messaging (SMS, EMS, MMS, USSD) control and data messages over the PLMN (200) by the said controlled SMSC module; and blocking or manipulating suspicious SMS, EMS, MMS and USSD communication transactions by the said controlled SMSC module (400), upon commands from the security center module (1000).

According to some embodiments, the at least one component of the CCN (100) is implemented as a service, and executed on the same physical machines as the home PLMN or hosting PLMN hardware components.

According to some embodiments, the method further comprises the steps of:

probing each of the said controlled modules within the CCN, and accumulating data regarding transactions, events and scenarios occurring on the hosing PLMN and data regarding communication between elements of the CCN and the hosting PLMN by a probe interface module (1300);

propagating the data accumulated by the said probe interface module (1300) to a data analysis module (1400);

analyzing by the said data analysis module (1400) parameters and characteristics of said encapsulated communication in real time or in near-real time, said parameters including at least one of: time patterns, volumes, destination address, source address, content and context, analyzing statistic deviations in the values of said parameters and characteristics exceeding predefined thresholds by the said data analysis module (1400);

analyzing accumulated historical data, pertaining to said parameters and characteristics of said encapsulated communication by the said data analysis module (1400);

identifying the occurrence of predefined suspicious events and scenarios on the hosing PLMN based on said analysis by the data analysis module (1400);

identifying security threats to the privacy of serviced subscribers and data stored on their UCD based on said analysis by the data analysis module (1400);

emitting activity messages from the data analysis module (1400) to other controlled modules of the CCN to avert the said identified security threats, and/or emitting alert messages to said administrative module and/or UCD to notify against said identified security threats;

maintaining an events' database (1100*a*), withholding important events and scenarios that occurred within the CCN and/or hosting PLMN;

receiving activity messages from said data analysis module (1400) to a security action management module (1600);

obtaining parameters of served subscriber's profile from a subscribers database (1100*b*);

commanding controlled modules (300, 350, 400, 500, 550, 800, 850) by the security action management module (1600), to carry out security actions as dictated by said activity messages from said data analysis module (1400), and avert said identified security threats, said security actions depending on: category of identified threat, the identified threat's probability, and the serviced subscriber's profile; and maintaining a database (1100*c*) of the security threats encountered during the activity of the CCN (100).

According to some embodiments, the method further comprises the steps of:

monitoring of incoming and outgoing communication pertaining to specific mobile applications executing on the UCD by the data analysis module (1400);

detecting significant deviations in said communication from expected communication patterns of said specific mobile applications, by the data analysis module (1400), wherein said communication patterns include at least one of: source address, destination address, communication volume, communication patterns and communication timing; and analyzing said detected deviations to identify illegitimate activity of mobile applications.

According to some embodiments, the method further comprises the step of configuring the UCD Lifeline Module (ULM) embedded within said serviced subscribers' UCD to initiate lifeline communication to the security action management module (1600) or respond to lifeline communication from the security action management module.

According to some embodiments, the method further comprises the steps of:
  initiating lifeline communication by said security action management module (1600) to the UCD, or responding to lifeline communication from the UCD by the security action management module (1600);
  reporting failure of reception of lifeline communication on the security action management module (1600) side to the data analysis module (1400) as real-time indication of an attempt to hijack the UCD from the hosting PLMN.
  invoking security actions by the UCD in response to failure of reception of lifeline communication on the ULM (20) side, said actions including at least one of: alerting the user regarding said failure of lifeline reception and altering at least one of the UCD's identity parameters.

According to some embodiments, the method further comprises the steps of:
  sending to the said security action management module (1600) real-time information by the ULM, regarding the status and whereabouts of the UCD through the lifeline communication channel, said information including at least one of: properties of the hosting PLMN, events of IRAT handover during voice calls, and events of BTS handover during voice calls;
  propagating said real-time information from the security action management module (1600) to the data analysis module (1400); and
  analyzing said information by the data analysis module (1400), and identifying at least one of following suspicious events and scenarios:
    illegitimate IRAT handover;
    illegitimate BTS handover;
    hijacking attempts of the UCD from its home PLMN (200) or visited PLMN (200b) to other networks; and
    illegitimate altering of UCD communication encryption properties.

According to some embodiments, the method further comprises the steps of:
  dynamically altering the value of one or more serviced subscribers' UCD identity parameters by an identity mediation module (1700), said identity parameters including at least one of IMSI, IMEI, IMEISV, MSISDN, Ki, Kc, TMSI, PTMSI, TLLI, ESN;
  communicating said alteration of identity parameter values from the identity mediation module (1700) to the ULM on the serviced subscribers' UCD through said Lifeline communication channel;
  receiving said required alteration of identity parameter values by said ULM module through said lifeline communication channel;
  propagating the required alteration of values of identity parameters stored on the Subscriber Identity Storage Element (SISE (30)), to said SISE (30), said parameters including at least one of IMSI, Ki and Kc;

applying by said SISE the said required alteration of values of serviced subscribers' UCD identity parameters stored on the SISE (30), said parameters including at least one of IMSI, Ki and Kc;
applying by said ULM (20) the required changes to values of UCD (10) identity parameters stored on the UCD; and
dynamically mediating between said altered UCD identity parameter values and the original UCD identity parameters by said identity mediation module (1700), thus facilitating the routing of the UCD communication with the hosting PLMN (200) or visited network (200b) using the altered identity parameters.

According to some embodiments, the method further comprises the step of invoking said alteration of one or more UCD identity parameter values according to at least one of the following configurations:
  according to a time based trigger;
  locally on the UCD (10), according to any logic preconfigured on the ULM (20) or SISE (30);
  locally by the ULM (20) or SISE (30), in response to a failure to receive Lifeline communication;
  remotely, according to any logic preconfigured on the identity mediation module (1700);
  remotely by the identity mediation module (1700), in response to failure to receive Lifeline communication;
  remotely by the identity mediation module (1700), in response to an event on the hosting PLMN (200);
  remotely by the identity mediation module (1700), in response to an activity message from the data analysis module, following an identified suspected threat, including IMSI catcher and Man-in-the-Middle (MitM) attacks; or
  any combination of the above.

According to some embodiments, the method further comprises the steps of:
  configuring the serviced subscribers' ULMs to possess a set of fallback identity parameter values; and
  upon the event of a lifeline communication failure between the security action module (1600) and the ULM of a serviced subscriber's UCD, the ULM will invoke alteration of UCD identity parameter values to said set of fallback values;
  reverting to using said set of fallback identity parameter values by the UCD;
  optionally invoking a UCD restart by the ULM, thus re-introducing the UCD to the CCN (100), bearing the said fallback identity parameter values.

BRIEF DESCRIPTION OF THE DRAWINGS

FIG. 6 is a flow diagram, which depicts the actions of the Probe interface module [1300]. This module is a part of the security center module [1000]. It Interfaces, manages and logs the probing of each of the probed modules deployed throughout the CCN [100].

FIGS. 7, 8 and 9 sequentially depict the flow diagram of the data analysis module [1400]. This module is a part of the Security center module [1000]. It receives probed information, maintains an events' database, analyzes transactions and events that occur on the hosting PLMN or visited PLMN in real time or in near-real time, and emits activity messages to other components of the CCN [100].

Monitoring, analyzing and logging Any Time Interrogation (ATI) and Send Routing Information (SRI) system queries;

Monitoring and analyzing location area updates during idle time (i.e. not during voice calls); and Monitoring and analyzing routing area updates during idle time (i.e. not during voice calls).

FIG. 11 depicts a flow diagram of the security action management module [1600]. This module is a part of the security center module [1000]. It interfaces each of the controlled modules of the CCN [100], and acts upon activity messages received from the data analysis module.

Figure 12:
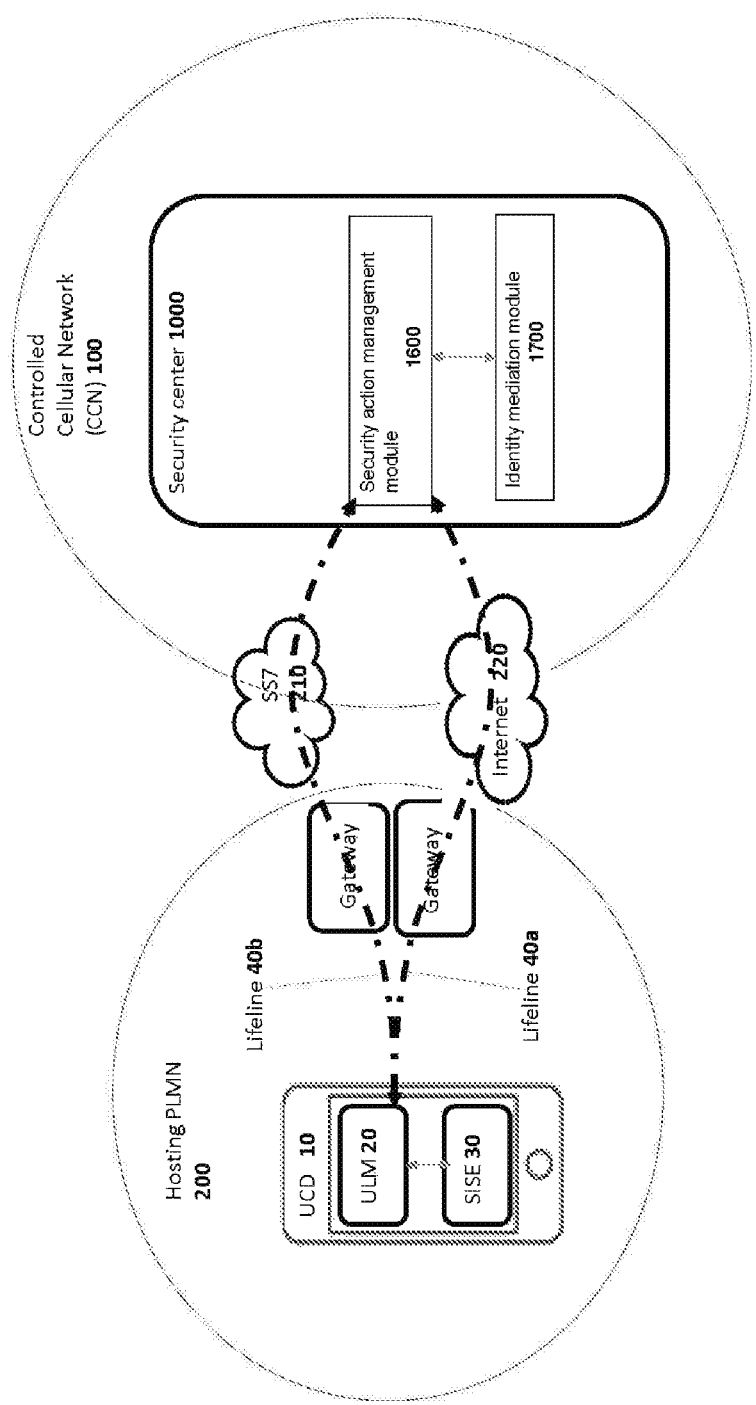

FIG. 12 is a simplified schematic block diagram, depicting the two-way Lifeline communication channel between the UCD and the security action management module 1600.

Figure 13:
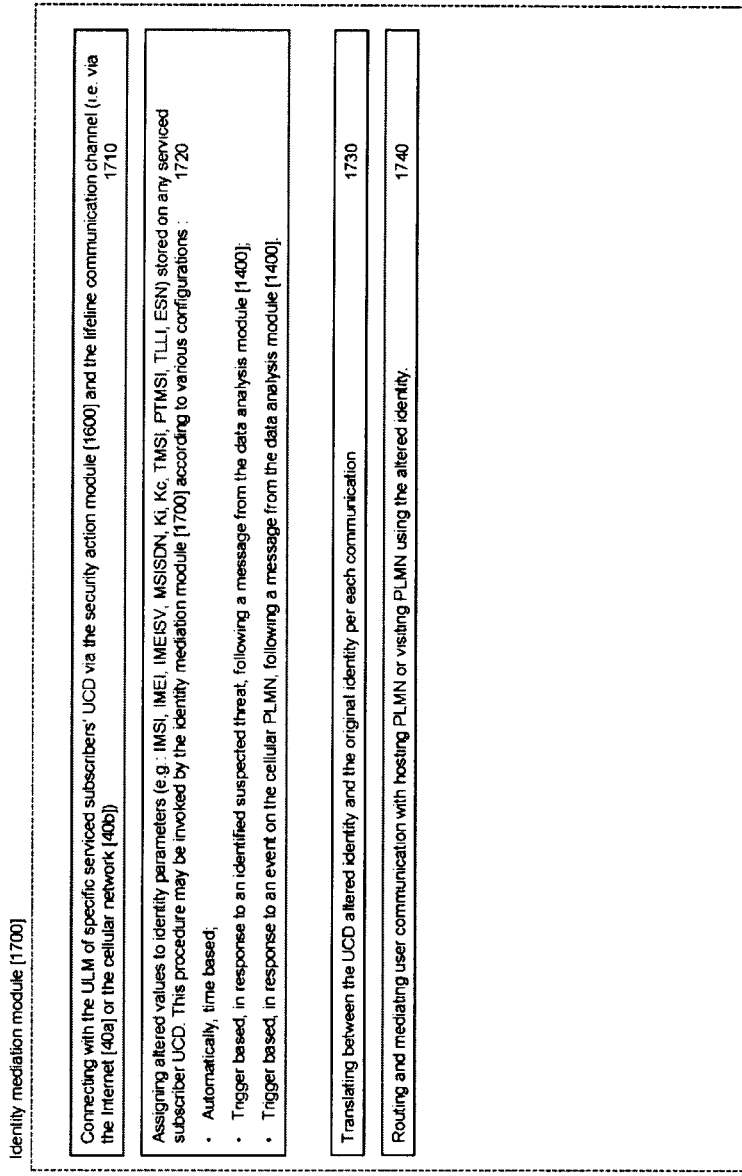

FIG. 13 depicts the flow diagram of the identity mediation module [1700]. This module is a part of the security center module [1000]. It is designed to dynamically change parameters relating to the cellular subscriber's identity, according to decisions made by the data analysis module [1400].

FIG. 14 depicts the flow diagram of the administrative module 700. This module provides an interface for configuring the components of one or more CCNs [100], to serve cellular subscribers of the hosting PLMN [200] network.

DETAILED DESCRIPTION OF SOME EMBODIMENTS OF THE INVENTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a table of definitions of the terms used throughout this application.

| Term | Definition |
|---|---|
| PLMN, Visited PLMN, Home PLMN, hosting PLMN | A public land mobile network (PLMN) is a wireless communication system that provides communication signals through the use of land based transmitters to a plurality of subscribed users.<br>A "Home PLMN" is a land based mobile communication system where the user is registered for service.<br>A "Visited PLMN" is a PLMN other than the Home PLMN, which currently accommodates cellular communication for a user registered for service on the Home PLMN.<br>Throughout this application, we have used the term "Hosting PLMN" to describe a PLMN which currently accommodates cellular communication for a user, regardless of the Home PLMN upon which the user is registered for service. |
| User Cellular Device(s) (UCD) | The term User Cellular Device(s) (UCD) is used throughout this application to describe user-end cellular appliances which utilize the hosting PLMN to connect to a cellular network.<br>It is to be made clear that the term UCD is used herein for the purpose of brevity, to describe any type of cellular appliance (e.g.: cellular phones, smartphones, tablet computers, laptop computers, IoT devices, M2M devices, connected cars etc.), connected by the hosting PLMN to a cellular network of any standard (e.g.: GSM, 3GPP, LTE). |
| Subscriber Identity Storage Element (SISE) | The term "Subscriber Identity Storage Element" (SISE) is used throughout this document to describe any type of element that stores parameters of the subscriber's UCD identity (e.g.: IMSI, Ki, Kc).<br>The SISE may be implemented as Universal Integrated Circuit Card attached to the UCD (e.g. UICC, SIM card, USIM card) or as a module embedded within the UCD Hardware and Software (e.g. EUICC, ESIM). |
| Cellular Controlled Network (CCN) | A system designed to enhance the privacy of cellular subscribers of a hosting PLMN, and the security of data stored on their UCD.<br>The CCN comprises of one or more controlled modules (300, 350, 400, 500, 550, 800, 850). Each said controlled modules may be implemented as any combination of hardware and software (e.g. on dedicated machines or as services on the hosting PLMN machines).<br>For the purpose of clarification, the interface between the hosting PLMN and the CCN may be described as similar (but not identical) to the interface of a Mobile Virtual Network Operator (MVNO) network to a Mobile Virtual Network Enabler (MVNE) network.<br>This interface accommodates the flow of data between the hosting PLMN and the CCN, and enables the CCN to provide serviced subscribers at least part of the following functionality: |

-continued

| Term | Definition |
| --- | --- |
| | Mobility Management (MM) of the user;<br>Short Message Services (SMS);<br>Supplementary Services (SS);<br>Intelligent Networks (IN) aspects;<br>Handling user data communication;<br>Signaling of incoming calls and SMS;<br>Incoming and outgoing USSD; and<br>All CAMEL transactions.<br>The CCN encapsulates communication between the UCD and the hosting PLMN, analyzes this communication in respect to each serviced subscriber, and provides them with the said security services, as elaborated below. |
| Serviced subscribers | A subset of subscribers of the hosting PLMN, for whom the CCN provides security services, according to predefined subscriber profiles. |
| Controlled modules | Modules comprising the CCN, each configured to complement the functionality of respective elements of the hosting cellular PLMN, and are configured, monitored and controlled by the Security center module [1000].<br>For example, the controlled SMSC module [400] complements the functionality of the SMSC module in cellular systems. It is responsible for routing Short Messages (SMS, EMS, MMS, USSD) between the CCN [100] and the hosting PLMN [200]. |
| Lifeline | A two-way communication channel between serviced subscribers' UCD and the security action management module (sub-module of the CCN). According to one embodiment, the Lifeline channel is implemented as switched packet data communication over the Internet, with SMS or USSD based communication fallback over the cellular hosting PLMN. Failure to receive Lifeline communication (on either the security action management module side or on the UCD side) may indicate an attempt to hijack the UCD to another network. |
| UCD Lifeline Module (ULM) | The UCD Lifeline Module (ULM) is optionally installed on serviced subscribers UCDs, and may be implemented by any combination of hardware and software (e.g. as a SIM applet or an application or service running in the UCD's background).<br>The ULM stores modules of instruction code which, when executed, configure the UCD to maintain a continuous two-way communication channel with the security action management module. |

The invention described henceforth relates to a system and a service that is designed to enhance cellular subscribers' security and privacy. This system is henceforth referred to as the "Controlled Cellular Network (CCN)". The CCN substitutes or complements the functionality of a hosting cellular PLMN of any standard (e.g.: GSM, 3GPP, LTE).

The CCN [100] is implemented as any combination of hardware and software, and comprises of at least one non-transitory computer readable storage device and one or more processors operatively coupled to the storage device on which are stored modules of instruction code, which when executed by the one or more processors implements the functionality of the CCN as explained below.

The CCN [100] interfaces the hosting PLMN in a similar manner to the interface of a Mobile Virtual Network Operator (MVNO) with a Mobile Virtual Network Enabler (MVNE) network. This interface accommodates the flow of data between the hosting PLMN and the CCN [100] and facilitates at least part of the following functions by the CCN [100]:
Mobility Management (MM) of the user;
Short Messages (SMS);
Supplementary Services (SS);
Intelligent Networks (IN) aspects;
Handling of user data communication;
Signaling of incoming calls and SMS;
Incoming and outgoing USSD; and
All CAMEL transactions.

The CCN [100] encapsulates and controls the interaction of said hosting PLMN with a subset of the PLMN's subscribers, henceforth referred to as "Serviced Subscribers".

All relevant types of cellular network communication, including at least part of: control, signaling, SMS and data communications between the hosting cellular PLMN and the serviced subscribers are routed through the CCN [100], and encapsulated within the CCN [100].

The CCN [100] monitors and analyzes said encapsulated communication in respect to each serviced subscriber, applies novel security measures and provides comprehensive network level security services to all serviced subscribers, as elaborated in this document further below.

The CCN [100] monitors, manages and logs the operation of serviced subscribers and their interaction with the hosting PLMN. It does so in accordance with individual subscription policies, thus providing individual levels and types of security and privacy services.

According to one embodiment of this invention, the CCN [100] monitors, manages and logs the operation of data networks, such as IoT (Internet of Things) networks, connected cars and Machine to Machine networks, to enhance data security and ensure the operational integrity of these data networks.

The CCN [100] system's core element is the "Security Center" module. This module:
Obtains its configuration from an administrative module;
Interfaces each of the CCN's modules;
Analyzes the communication among the said modules and their activity;
Detects and determines the probability of existence of network security threats;
Acts upon threats in real time to ensure the serviced subscribers' security and privacy, in accordance with the serviced subscribers' requirements and entitlements, in face of the specific threat category and probability;

Keeps record of all system events and encountered threats.

The security center accesses and maintains the following databases, upon which it acts to enforce policies of serviced subscribers' security and privacy:

The subscribers' database—withholding a list of subscribed users and (optionally) their profile, and their entitlements for services according to their acquired security policy;

The threats database—withholding all entities which have been analyzed, and have been found suspicious or threatening; and The events database—withholding all networking events that have been probed by the system.

It is to be understood that the CCN [100] may apply its security and privacy services to subscribers of any cellular network. The examples henceforth given in this application relate to 2G, 3G and 4G (LTE) networks, but as examples—they do not pose any limitation on this application.

Figure 1:
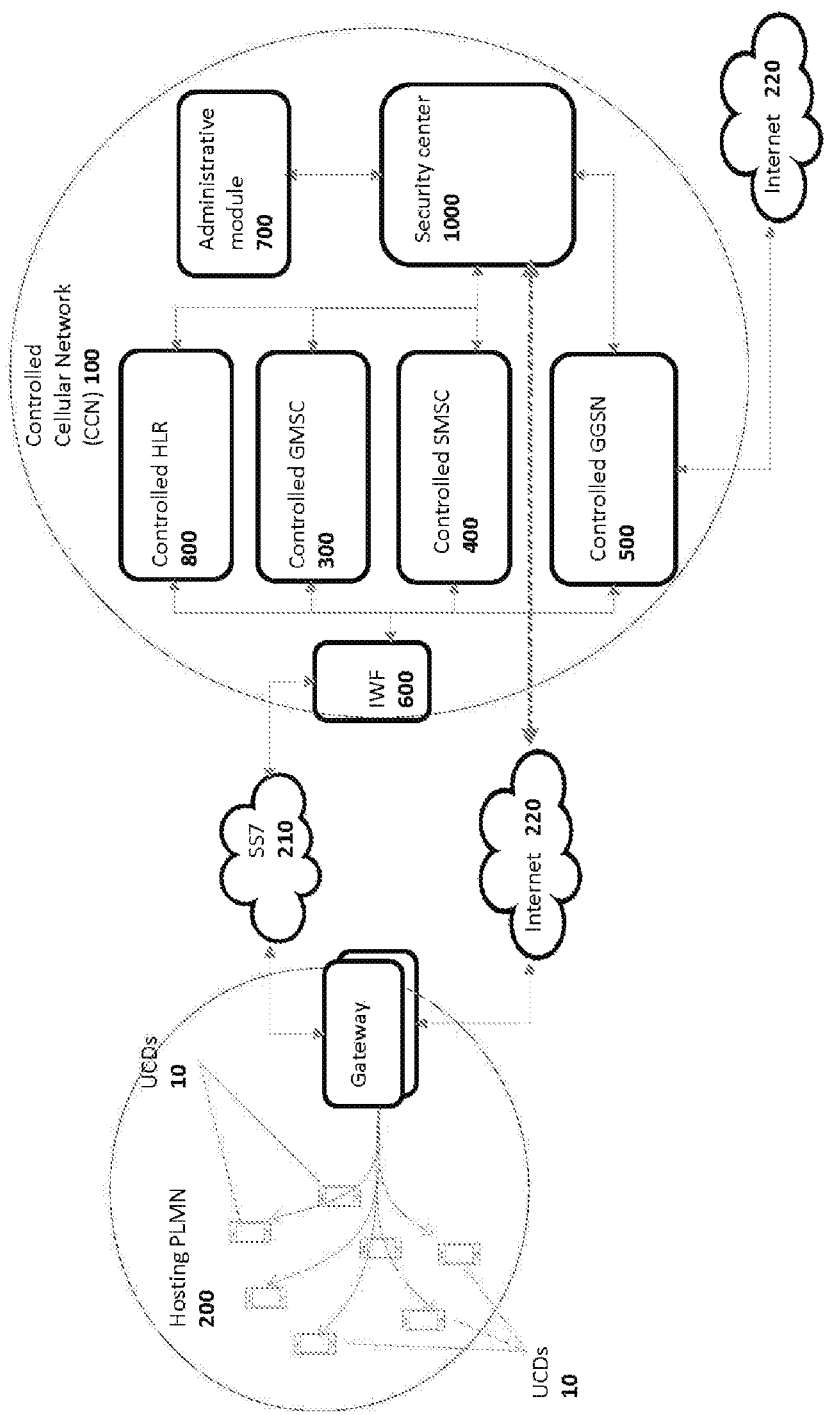
FIG. 1 shows a block diagram, depicting the activity of the Controlled Cellular Network (CCN) [100] in a cellular 2G/3G Hosting Public Land Mobile Network (PLMN) [200] context.
Figure 2:
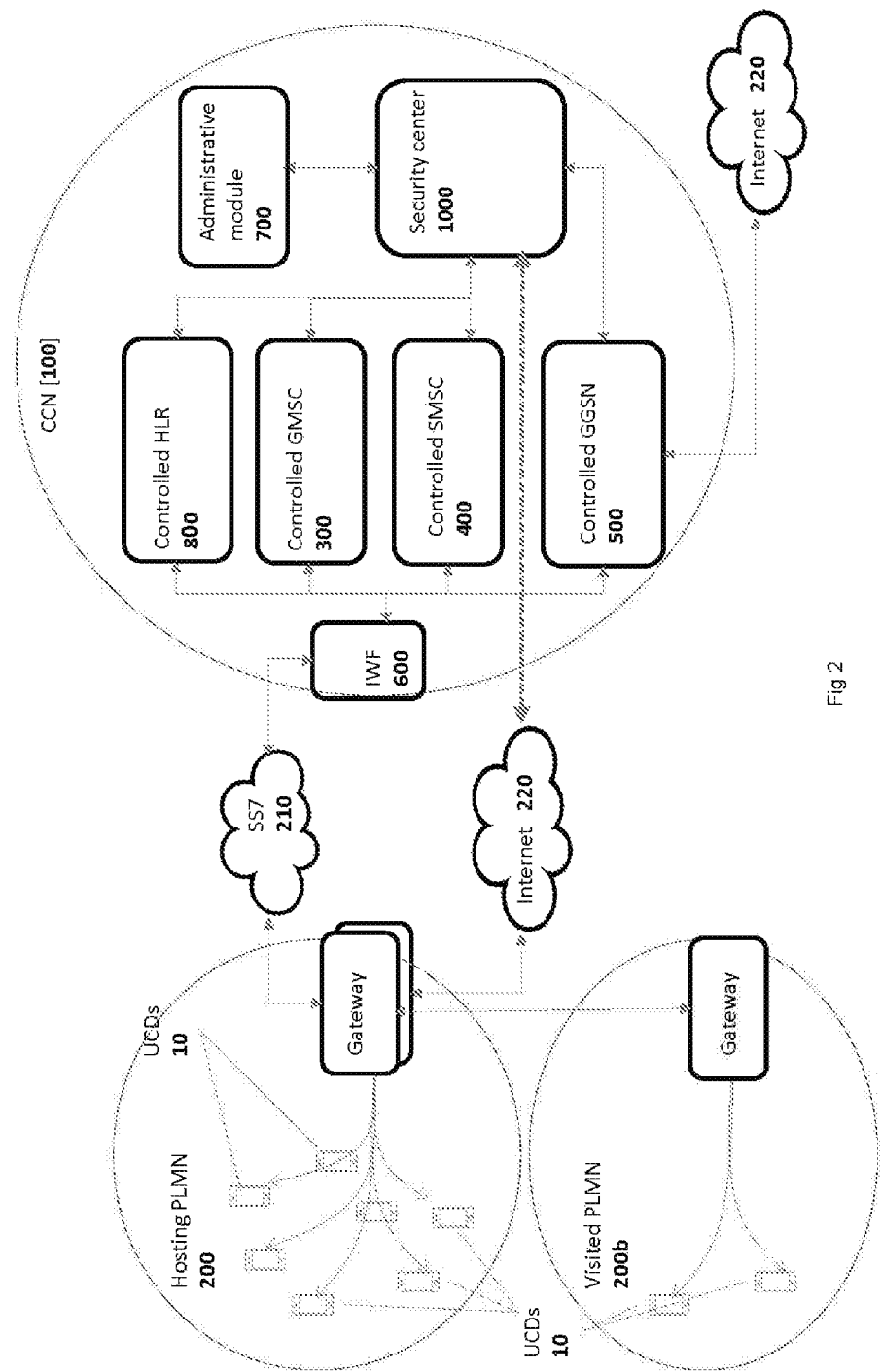
FIG. 2 shows a block diagram, depicting the activity of the Controlled Cellular Network (CCN) [100] in relation to cellular 2G/3G subscribers, currently served by a visited PLMN [200b].
Figure 3:
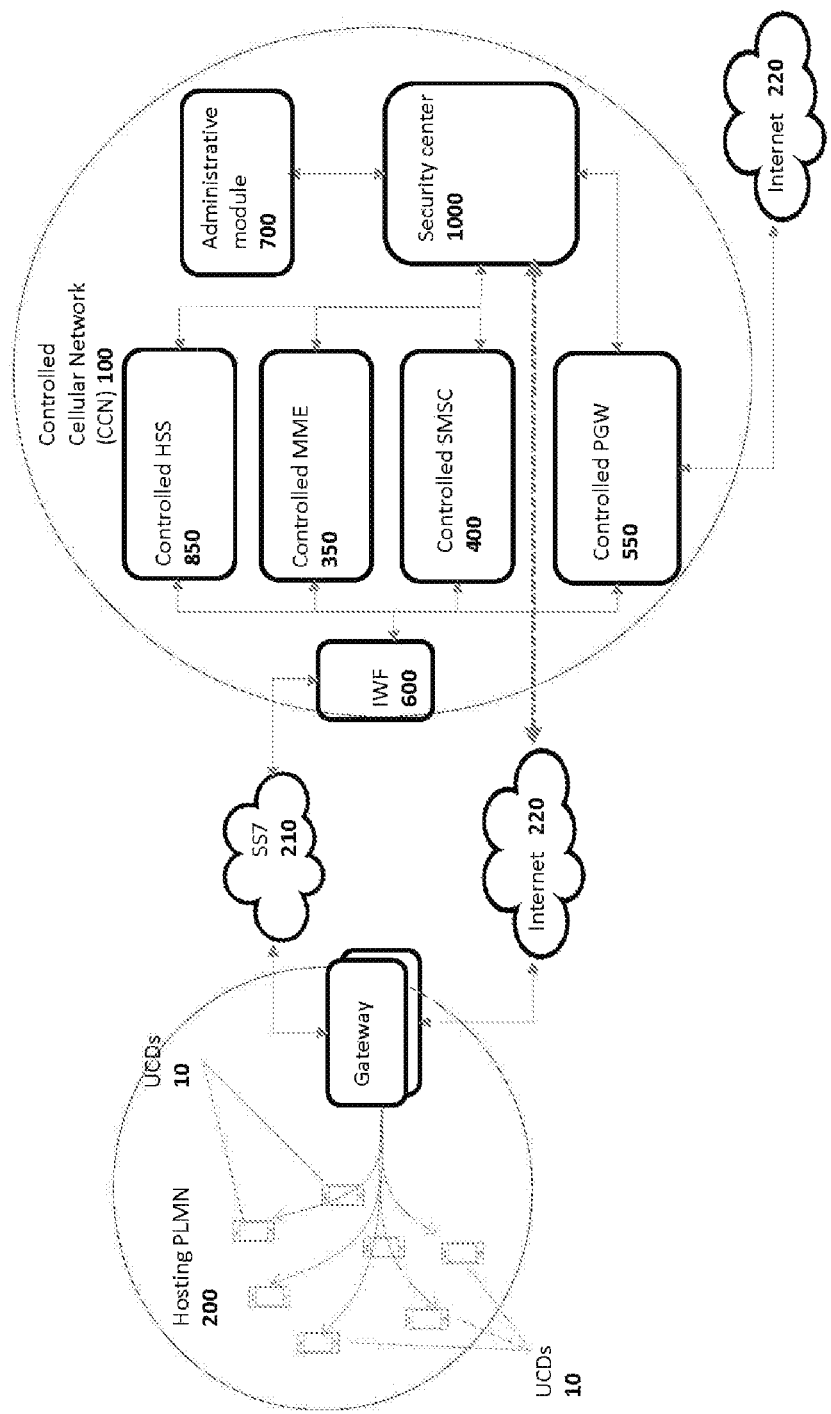
FIG. 3 shows a block diagram, depicting the activity of the CCN [100] in a cellular 4G (LTE) Hosting PLMN [200] context.

FIGS. 1, 2 and 3 are block diagrams of the components and environment of a CCN [100] system. This system provides services to a group of cellular subscribers which are hosted in a hosting PLMN [200].

The CCN system [100] encapsulates all control, management and data transactions that are executed from and towards the cellular subscribers serviced by the said CCN [100] (i.e. serviced subscribers). It monitors and manages all aspects of communication within the CCN [100], and between the CCN and the hosting PLMN [200], or possibly a visited PLMN [200b].

According to some embodiments of this invention, at least one component of the CCN [100] is implemented and executed on either a physical or virtual machine independent of the hosting PLMN or home PLMN hardware components.

According to some embodiments of this invention, at least one component of the CCN [100] is implemented as a service, and executed on the same physical machines as the home PLMN or hosting PLMN hardware components.

According to one embodiment of the present invention, the CCN [100] system may be configured to provide security services to organizational groups of cellular subscribers of the hosting PLMN [200], according to each organizational group's profile of entitled services.

FIG. 1 depicts the activity of the said CCN [100] in a cellular 2G/3G hosting PLMN [200] context.

The CCN [100] core element is the "Security center" module [1000]. This module [1000] is configured to:
Interface each of the CCN's modules;
Analyze the communication and activity of the said modules;
Detect and determine the probability of existence of security threats;
Act upon threats in real time, to ensure the serviced subscribers' security and privacy. This is done in accordance with a predefined policy, reflecting the serviced subscribers' requirements and entitlements; and
Keep record of all system events and encountered threats.

The administrative module [700] provides an interface to the security center module [1000], and enables administrators to perform at least one of:
Configuring the CCN's [100] environment;
Instantiating specific controlled modules within the CCN [100];
Defining subsets of hosting PLMN network subscribers that are to be granted security services by the CCN [100] (i.e. "serviced subscribers");
Defining the different attributes of said serviced subscribers (e.g. serviced subscribers membership in organizational groups, the level of security services they are entitled to, etc);
Defining a set of thresholds relating to various parameters and characteristics of host network communication. Said parameters including, for example: time patterns, data volumes, destination address, source address, content, context, etc.;
Defining a set of suspicious events and scenarios that take place in the hosting PLMN [200] network, to be monitored by the CCN [100];
Defining specific security measures that are to be taken in the occurrence of said suspicious events and scenarios; and
Configuring reports and alerts that would be emitted in the occurrence of said suspicious events and scenarios.

The controlled HLR module [800] complements the functionality of the HLR module in 2G/3G cellular systems, within the CCN [100]. This module [800] withholds a database upon which information regarding the serviced subscribers is kept. It is configured, monitored and controlled by the security center module [1000].

The controlled Gateway Mobile Switching Center (GMSC) module [300] complements the functionality of the GMSC module in 2G/3G cellular systems, within the CCN [100]. This module [300] serves to route cellular calls between UCDs of serviced subscribers of the CCN [100] and the hosting PLMN [200]. It is configured, monitored and controlled by the security center module [1000], and provides to the security center module [1000] data regarding hosting PLMN (200) control messages.

The controlled Short Messaging Service Center (SMSC) module [400] complements the functionality of the SMSC module in cellular systems. This module [400] is responsible for routing Short Messages (SMS, EMS, MMS, USSD) between the CCN [100] and the hosting PLMN [200], and is configured, monitored and controlled by the Security center module [1000]. The controlled SMSC module [400] provides data to the security center module (1000) regarding Short Messaging (e.g. SMS, EMS, MMS, USSD) control and data messages over the PLMN (200).

The controlled Gateway GPRS Support Node (GGSN) module [500] complements the functionality of the GGSN module in 2G/3G cellular systems, within the CCN. This module [500] serves to connect serviced subscribers to external packet switched networks, such as the Internet [220], Internet of Things (IoT), Machine to Machine (M2M) networks or connected cars' data networks.

The controlled GGSN module [500] routs packet switched data between the CCN [100] and the hosting PLMN, and provides to the security center module [1000] data regarding switched data packets transactions over the hosting PLMN [200].

The controlled GGSN module [500] is configured, monitored and controlled by the security center module [1000].

According to one embodiment of the present invention, the CCN [100] may be comprised of all the modules depicted within FIG. 1 (i.e. controlled HLR 800, controlled GMSC 300 etc), or any subset thereof.

FIG. 2 shows a block diagram, depicting the activity of the CCN [100] in relation to cellular 2G/3G subscribers that have roamed from their home PLMN [200] and are currently being served by a visited PLMN [200b]. It is clear from this diagram that the CCN's [100] functionality is substantially unaffected by roaming of serviced subscribers to cellular networks other than their home PLMNs [200]. This is because all the data directed to and from the roamed subscribers still reaches the home PLMN network, and is still routed through the CCN [100].

FIG. 3 shows a block diagram, depicting the activity of the said CCN [100] in a cellular 4G (LTE) Hosting PLMN [200] context.

The CCN [100] system's core element is the "Security center" module [1000]. The summary of the security center's functionality is brought above, in relation to FIG. 1.

The functionality of the administrative module [700] is brought above, in relation to FIG. 1.

The controlled Home Subscriber Server (HSS) module [850] complements the functionality of the HSS module in 4G cellular systems, within the CCN [100]. This module [850] holds a database upon which information regarding the serviced subscribers is kept. It is configured, monitored and controlled by the Security center module [1000].

The controlled Mobility Management Entity (MME) module [350] complements the functionality of the MME module in 4G cellular systems, within the CCN [100]. This module [350] serves to route cellular calls between serviced subscribers of the CCN [100] and the hosting PLMN [200]. It is configured, monitored and controlled by the security center module [1000], and provides to the security center module [1000] data regarding hosting PLMN (200) control messages.

The controlled Short Messaging Service Center (SMSC) module [400] complements the functionality of the SMSC module in cellular systems. This module [400] is responsible for delivering Short Messages (SMSs), and is configured, monitored and controlled by the Security center module [1000].

The controlled Packet Data Network Gateway (PGW) module [550] complements the functionality of the PGW module in 4G cellular systems, within the CCN [100]. This module [550] serves to connect serviced subscribers to external packet switched networks such as the Internet [220], Internet of Things (IoT), Machine to Machine (M2M) networks or connected cars data networks.

The controlled PGW module [550] routes packet switched data between the CCN [100] and the hosting PLMN, and provides to the security center module [1000] data regarding switched data packets transactions over the hosting PLMN [200].

The controlled PGW module [550] is configured, monitored and controlled by the security center module [1000].

The activity of the CCN [100] in relation to cellular 4G subscribers is unaffected by the roaming of users from their home PLMN [200] to a visited PLMN [200b], as explained above in relation to FIG. 2.

Figure 4:
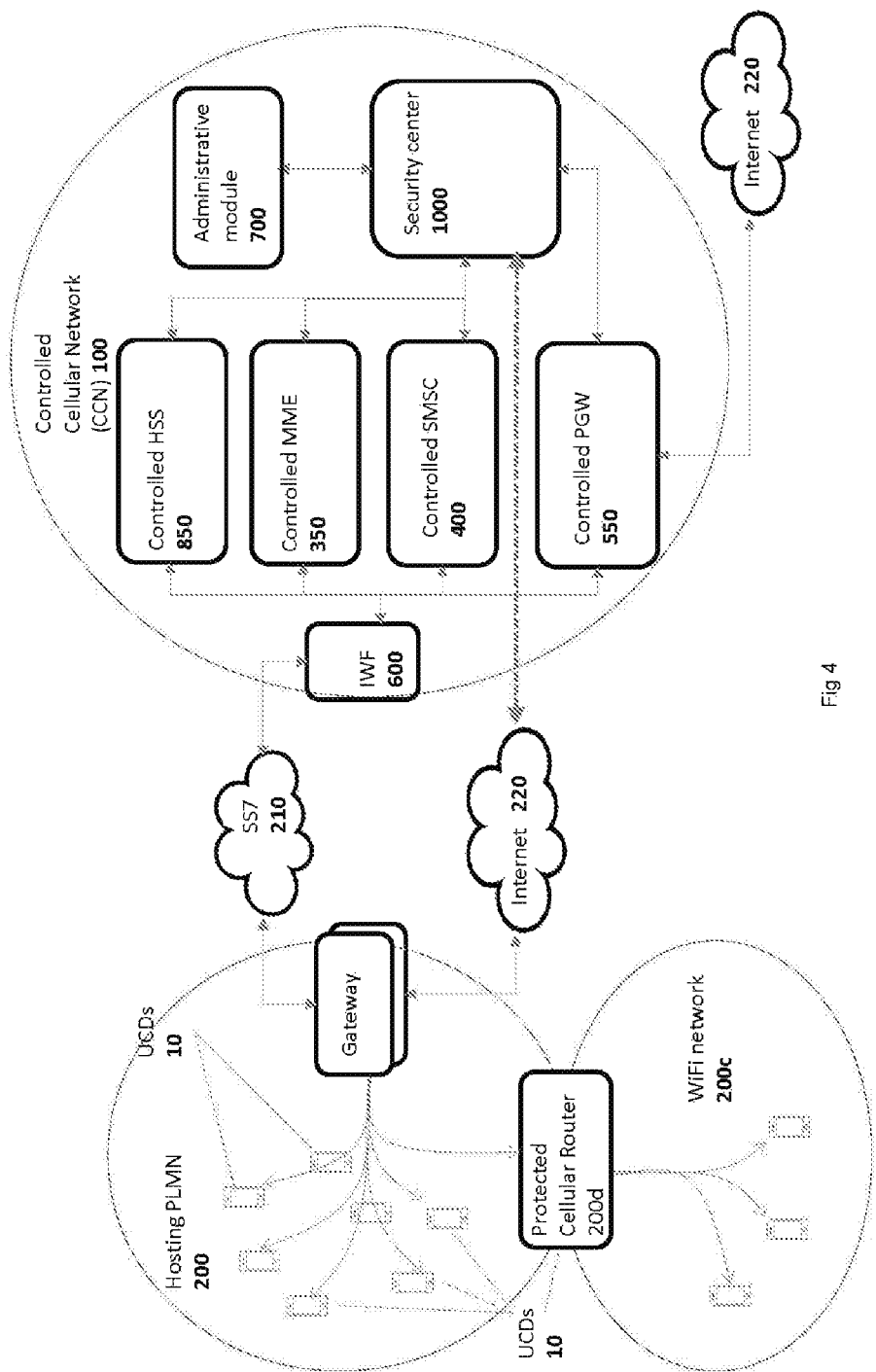
FIG. 4 is a block diagram which depicts a configuration of the CCN [100], designed to provide security services to its subscribers over a WiFi network [200c], according to some embodiments of the present invention.

FIG. 4 is a block diagram which depicts a configuration of the CCN [100], designed to provide security services to its subscribers over a WiFi network [200c], according to some embodiments of the present invention.

In this embodiment, the communication of the UCDs to the Internet [220] is performed via WiFi, rather than directly via the cellular hosting PLMN [200] network. The CCN [100] employs a protected cellular router [200d] as a gateway between the WiFi [200c] wireless network, via the hosting PLMN [200] en-route the Internet. The protected cellular router [200d] routes all internet communication to serviced subscribers' UCDs via the CCN [100], thus providing the required security services to serviced subscribers' UCDs even when they do not interface a cellular network.

According to some embodiments, the protected cellular router [200d] comprises a Wifi wireless switch. According to other embodiments, the protected cellular router [200d] acts only as a gateway, and does not comprise comprises a Wifi wireless switch.

Figure 5:
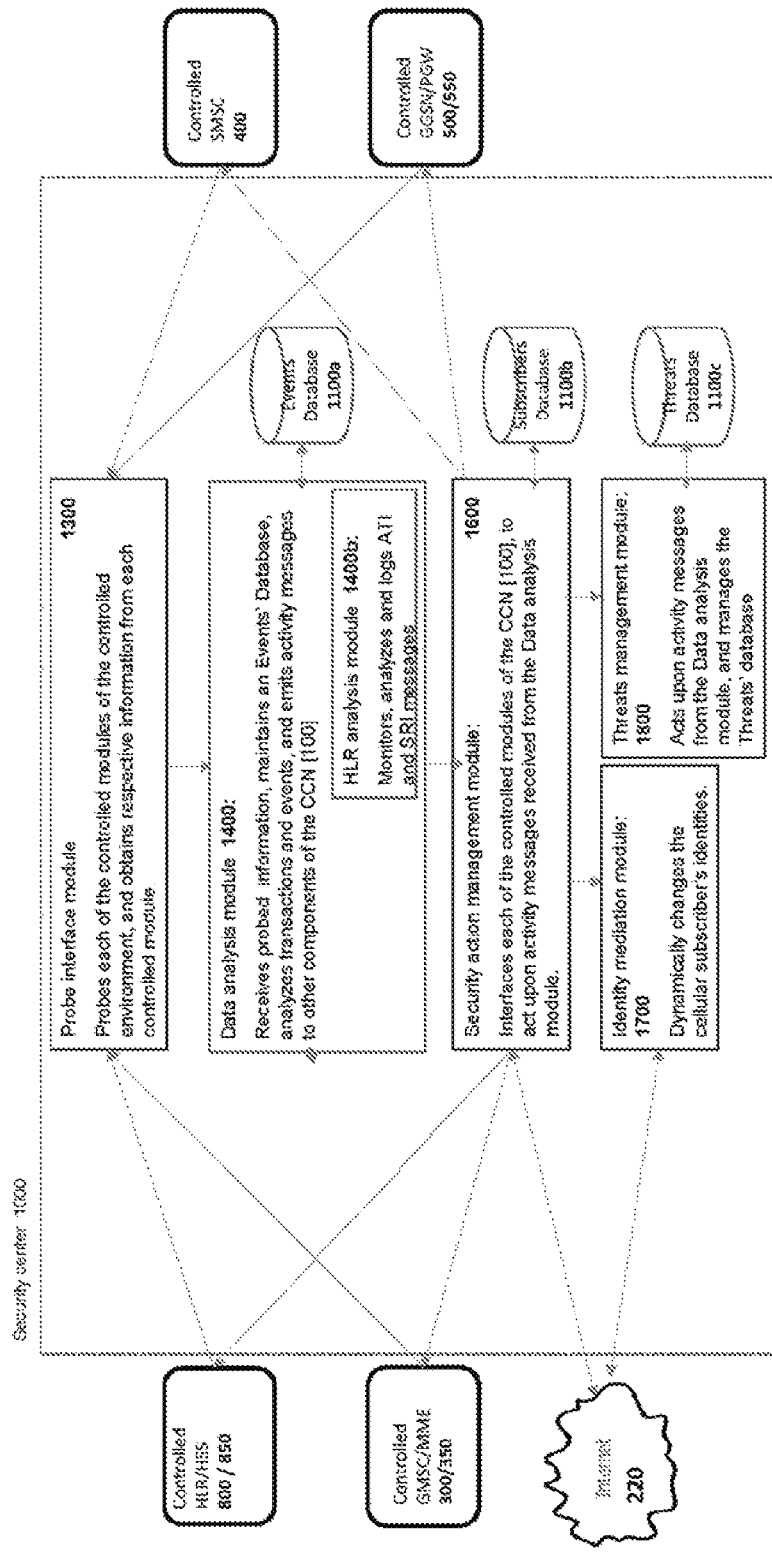
FIG. 5 is a block diagram which depicts the components and environment of the Security center module [1000]. This module is the central component of the CCN [100]. It manages the action of all other controlled components, and maintains the system's different databases.

FIG. 5 is a block diagram which depicts the components of the security center [1000].

The probe interface module [1300] probes each of the controlled modules deployed in the CCN [100]. It obtains respective information from each of the controlled modules (e.g. the controlled H LR [800], controlled HSS [850], controlled GMSC [300], controlled MME [350], etc.), regarding events that occur on the hosting PLMN [200] and regarding communication between elements of the CCN [100] and the hosting PLMN [200] or visited PLMN [200b].

According to one embodiment, the probe interface module [1300] may also acquire data from dedicated probing modules that are deployed within the hosting PLMN [200]. These dedicated probing modules may be implemented as any combination of software and hardware. They may also be implemented as software services running on the hosting PLMN [200] modules' machines. The dedicated probing modules are configured to query data locally from hosting PLMN [200] modules, and propagate the acquired information to the probe interface module [1300]. This configuration is intended to overcome difficulties that may arise from issues of connectivity or security and permission policies instated within the hosting PLMN [200] environment.

The data analysis module[1400] is implemented as any combination of software and hardware, and is configured to Receive information from all probed components;

Maintain the events' database;

Analyze transactions and events that take place on the CCN [100] or on the serviced subscriber's UCD;

Identify data security and privacy threats to serviced subscriber's UCD; and

Emit appropriate action messages to overcome the said threats.

Examples for different types of threat analysis performed by the analysis module [1400] are:

Identification of predefined suspicious scenarios;

Identification of statistical deviation from predefined thresholds regarding network transaction parameters (e.g.: message timing, frequency, context, patterns, volumes, destination address, contents, etc.); and Identification of known threat related activity (e.g. connection to black-listed websites or downloading of spam messages and emails).

The HLR analysis module 1400b is a subsidiary of the data analysis module [1400]. It is specifically configured to monitor, analyze and log all events and scenarios relating to ATI and SRI queries.

Based on its process of analysis, the data analysis module [1400] emits activity messages to other components of the CCN through the security actions module [1600]. Such messages may, for example, invoke immediate security actions or begin long term monitoring of transactions and events within the hosting PLMN [200], to follow up on unfolding scenarios.

The events database [1100a] is maintained by the data analysis module [1400]. It is used for keeping track of all events that have been probed and analyzed by the system. This data serves to analyze scenarios based on the occurrence of patterns and sequences of events, as well as for reporting purposes.

According to one embodiment, the data contained in the events database is further processed by a computer, configured to employ machine learning algorithms, and extract information relating to network threats.

The security action management module [1600] acts upon activity messages received from the data analysis module. It interfaces each of the CCN [100] components, and applies the required security measures to ensure the privacy and security of the serviced subscribers.

The subscribers' database [1100b] withholds data relating to the identity and profile of service entitlements that is attributed to each serviced subscriber and each organizational group of serviced subscribers. The security action management module [1600] accesses the subscribers' database [1100b] to ascertain whether the action required by the activity message is applicable to specific serviced subscribers, according to the profile of the said subscribers' service entitlements. For example, a user or an organizational group of users may be entitled to receive warning messages against suspected threats, but not entitled to have active measures taken to avert the said suspected threats.

The threats management module [1800] acts upon activity messages received from the data analysis module [1400]. It interfaces the threats database [1100c], and manages it to maintain a list of suspicious source and destination IPs, URLs and Point codes of source calls, SMS, EMS, MMS and data transactions.

According to one embodiment, the threats management module [1800] interfaces the events database 1100a, and employs a processor, configured to apply machine learning algorithms on the data contained in the events database 1100a. In this embodiment, the said machine learning algorithms refine the definitions of specific network threats and threat categories within the threats database [1100c]. Examples for such refinement include:

Identification of new threat categories (e.g. new methods for UCD-resident data phishing);
Identification of new threats of familiar categories (e.g. new blacklisted URL);
Identification of actions and scenarios taken by familiar or new threats (e.g.
actions that aim to identify and track the location of a specific UCD); and
Improving the assessment of a specific monitored event as one that originates from a network threat (e.g. reduce "false positive" alarms).

The threats database module [1100c] is maintained by the threats management module [1800]. It is used for keeping track of all identified threats; blacklisted source and destination addresses (e.g. Point Codes, URLs and IPs), of suspicious cellular calls, SMS, EMS and MMS messages and data transactions. The data contained in the threats database module [1100c] serves to:

Provide real-time immunity against network threats;
Emit reports portraying the status of threats in the CCN's [100] environment; and
Continuously enhance the definitions of threats and threat categories in the CCN [100] environment.

The identity mediation module [1700] is configured to dynamically change the serviced subscriber's UCD identity parameter values (e.g.: IMSI, Ki, Kc etc.) to maintain the subscriber's security and privacy. This action may be configured to be applied either:

Periodically; or
in response to an identity query event on the network; or
in response to activity messages received from the data analysis module, following the identification of suspected network threats; or
any combination of the above.

FIG. 6 is a flow diagram, which depicts the actions of the probe interface module [1300].

The probe interface module [1300] interfaces each of the CCN's components (e.g. the controlled GMSC [300] and controlled MME [350] modules), and is configured to manage the probing of events and transactions that take place within the CCN [100], and between the CCN [100] and the hosting PLMN [200] or visited PLMN [200b] (step 1310).

According to one embodiment, the CCN [100] may not be implemented in its entirety, or may be partially inaccessible to the security center due to any reason. For example, the controlled system's modules may be implemented in part as services on the hosting network's machines, and may consequently be restricted from transmitting some data (e.g. by a firewall service installed on the hosting network's machines). In this embodiment, dedicated probing modules or services (not shown in figures) may be implemented and deployed within the PLMN [200] environment, to compensate for this lack of accessibility. The said dedicated probing modules would query the required information locally on the hosting PLMN [200], and propagate it to the security center module [1000] for further processing.

According to one embodiment, the probe interface module [1300] is configured to manage the probing of events and transactions according to instructions sent to it by the data analysis module [1400]. This is to accommodate analysis of specific scenarios as they unfold within the CCN [100] environment.

The probe interface module [1300] obtains voice call control messages by probing the controlled GMSC [300] and controlled MME [350] modules (step 1320).

The probe interface module [1300] obtains packet switching information between the visitor CCN [100] and the Hosting PLMN [200] by probing the controlled GGSN [500] and controlled PGW [550] modules, as well as external packet switched networks such as the Internet, IoT networks, M2M networks and connected cars networks (step 1330).

The probe interface module [1300] obtains short messaging (SMS/EMS/MMS/USSD) control and data information by probing the controlled SMSC [400] module (step 1340).

The probe interface module [1300] monitors access events to the controlled HLR [800] and controlled HSS [850] from the Hosting PLMN [200] network, and logs changed entries to the controlled HLR [800] and controlled HSS [850] databases (step 1350).

The probe interface module [1300] propagates the accumulated data to the data analysis module [1400].

FIGS. 7, 8 and 9 sequentially depict the flow diagram of the data analysis module [1400].

The data analysis module [1400] obtains data from the probe interface module [1300], originating from all controlled entities within the CCN environment (step 1410).

The data analysis module [1400] maintains the events database [1100a], within which it keeps track of all events that have been recorded by the probe interface module [1300]. This data serves to analyze scenarios based on the occurrence of singular events, or strings of events, on the hosting PLMN [200] or visited PLMN [200b] (step 1420). The said analysis may be performed in real time or near-real time, or based upon longer period of monitoring and accumulation of historical data.

The data analysis module [1400] analyzes cellular communication according to destination, timing patterns (step 1430) and volume (step 1440), identifying statistic deviations that exceed pre-defined thresholds. For example:

Repetitive data messages recurring beyond a predefined frequency may be considered as spamming, or as targeted cyber attacks against a specific UCD.

The functionality of mobile applications is characterized by specific communication properties. Mobile applications are expected to interface specific online servers (normally by DNS, not by IP number), and conduct communication of specific type, timing and volume with the said specific servers. The data analysis module [1400] monitors incoming and outgoing communication pertaining to specific mobile applications executing on the UCD. It detects and analyzes significant deviations from expected communication patterns of those specific mobile applications. Said application-specific communication patterns include at least one of: source address, destination address, communication volume, communication patterns and communication timing.

The data analysis module [1400] analyzes the content and context of switched packet messages (step 1450), to identify:

- Relation to known threats, blacklisted or grey-listed URLs and IPs. In some embodiments, the data analysis module [1400] may invoke end-point verification procedures (whois) if necessary;
- DNS address changes on the UCD. Such identification may indicate traffic redirection to MitM (Man in the Middle) sites. In some embodiments the data analysis module [1400] may invoke end-point verification procedures ('whois') in response;
- Upload of sensitive information, stored either on the UCD or originating from it (e.g. video or audio data streams), or uploading of data by IP target address only (no hostname); and
- Download of malicious data, such as viruses, spyware or malware of any kind, including malware designed to lock stored information ('Ransomware') or for locking the UCD.

According to some embodiments, the data analysis module [1400] is configured to apply machine learning algorithms to the aggregation of data relating to:
- packet—switched communication;
- signaling messages; and
- text messages.

The said machine learning algorithms are designed to classify web sites according to the likelihood of specific serviced subscribers to visit them, taking into account the subscribers' surfing history and profile (step 1460). This classification facilitates the identification of exceptional content and websites significantly different than those typically viewed by the user, and pose a probable security threat.

The data analysis module [1400] is configured to analyze the content and context of SMS/MMS/EMS messages, and identify at least one of (step 1470):

- Occurrence of suspicious scenarios (e.g. an identification procedure directly followed by an SMS message may indicate an attempt to target a specific UCD for attack);
- Reception of messages bearing malicious content (e.g. silent, incomplete or empty SMS message, or a link to a blacklisted site); and
- Reception of SMS messages from a spoofed SMS sender addresses (e.g.:
  similar messages that arrive via different gateways, messages that arrive via SMTP protocol rather than SS7, similar messages that are sent to multiple, sequential subscriber phone numbers).

The data analysis module [1400] is configured to analyze the content and context of SS7 [210] control messages, and to identify and act upon suspicious scenarios (step 1480), for example:

- Receiving a notification, originating from the Subscriber Identity Storage Element (SISE) (e.g. SIM card, ESIM) of a serviced subscriber's UCD, regarding a change of RAT (e.g. switching of cellular communication from UMTS to GSM) protocol. Such a change may indicate an attempt to access unencrypted data on the UCD. According to one embodiment of the control system, this notification may be obtained either via the Internet [220], or through the Cellular network;
- Receiving a notification, originating from the of a serviced subscriber, regarding a system request for a communication encryption deactivation. Such a change may indicate an attempt to access data on the UCD. According to one embodiment of the control system, this notification may be obtained either via the Internet [220] or through the Cellular network;
- Receiving an Any Time Interrogation (ATI) query, followed by an SMS message. Such a scenario may indicate an attempt to determine and follow the UCD's physical location;
- Receiving an IMSI identification request, not within the UCD's registration process. Such a scenario may indicate an illegitimate attempt to obtain parameters of the UCD's identity, such as done by IMSI catchers;
- A change in access point settings, such as APN, MMSC may indicate an attempt to hijack the UCD to a different data network;
- A change in the serving cell ID (CID), that is inconsistent with the BTS physical location or the UCD's physical location. Such a change may indicate an attempt to hijack the UCD to another cellular network; and
- Unexpected requests for execution of UCD authentication procedures against the HPLMN [200] Authentication Center (AUC).

Cellular subscribers may be connected to the Internet by one of two constellations:

- through a protected cellular router (200d, as elaborated above, in relation to FIG. 4), wherein the CCN [100] provides real-time security services to the said cellular subscribers; or
- through a non-protected cellular router, wherein the CCN [100] does not provide real-time security services to the said cellular subscribers.

The data analysis module [1400] is configured to analyze events surrounding the UCD connection to a WiFi network via a non-protected cellular router, in order to identify and act upon suspicious events and scenarios (step 1490), for example:

- Tracking the history of visited websites during the UCD connection to the WiFi network:
  - Comparing the said visited websites to blacklisted and grey-listed sites within the threats database;
  - Comparing the said visited websites to sites that are unlikely for specific subscribers to visit; and
  - Optionally issuing an alert to the subscriber, informing them that a possibly illegitimate website has been visited during their connection to the WiFi network.
- Examining properties of the WiFi network (e.g.: SSID, protocol type, security type, network band and network channel) in order to detect suspicious WiFi network connections (e.g.: one that bears an identical SSID to a different WiFi network that already resides in the UCD list of known WiFi networks).

Detecting suspicious actions (e.g.: uploading streaming video or data stored on the UCD, capturing a screen image, or operating the UCD microphone) during the UCD connection to the WiFi network.

The data analysis module [1400] employs the subsidiary HLR analyzing sub-module [1400b], to analyze access to the controlled HLR [800] or controlled HSS [850] modules, and identify suspicious scenarios (step 1500), for example:

Update of the UCD routing area between physically inconsistent BTS; and

Reception of unexpected ATI or SRI queries.

The data analysis module [1400] determines the probability of existence of security threats and threat categories, according to the different methods of data analysis, as elaborated above (step 1510).

The data analysis module [1400] updates the profile of known threats and threat categories according to newly identified security threats (step 1520).

The data analysis module [1400] determines whether to invoke security actions in response to the said determined security threat, taking into account:

The type and probability of the determined security threat; and

The profile of service entitlements per each serviced subscriber.

The data analysis module [1400] emits an activity message to the security action management module 1600, in respect to the determined required security action (step 1530). The security action management module 1600 carries out the said security action, as dictated in the data analysis module's [1400] activity message.

The data analysis module [1400] emits an activity message to the security action management module 1600, in response to identification of threats related to voice-call control messages (step 1540). This may invoke actions such as:

Denial of voice call reception by the controlled GMSC [300] or controlled MME [350] modules;

Altering the UCD identity properties by the identity mediation module;

Denial of all UCD services (e.g. reception and transmission of switched data packets and voice calls);

Emitting an alert, to be displayed on the UCD screen, or a recommendation to revert the UCD to its default or factory settings; and Emitting an alert, to be displayed on the administrative module [700].

The data analysis module [1400] emits activity messages to the Security action management module, in response to SMS/MMS/EMS related threat identification (step 1550). This may invoke action by the controlled SMSC [400] module, such as denial of SMS message reception.

The data analysis module [1400] emits activity messages to the Security action management module, in response to switched-packet-related threat identification (step 1560). This will invoke action by the controlled PGW [550] and controlled GGSN [500] components, such as blocking the transmission and/or reception of switched data packets.

The data analysis module [1400] emits activity messages to the Security action management module and to the identity mediation module [1700], in response to suspected network-based attacks, such as location tracking attacks or Man-In-The-Middle attacks (step 1570). These activity messages may invoke security actions by the identity mediation module [1700], controlled HLR [800] and HSS [850] modules, for example:

The controlled HLR [800] and HSS [850] modules may produce altered responses to ATI and SRI location queries; and The identity mediation module [1700] may alter UCD identity parameters stored on the UCD (e.g. IMSI, IMEI, IMEISV, MSISDN, Ki, Kc, TMSI, PTMSI, TLLI, ESN).

The data analysis module [1400] notifies the threats management module [1800] regarding suspicious URLs, IPs, and Point codes of source calls, SMS, EMS, MMS and data transactions. The threats management module [1800] maintains this information in the threats database [1100c] (step 1580).

The data analysis module [1400] maintains a log of all events and conditions met during the data analysis process (step 1590).

Figure 10:
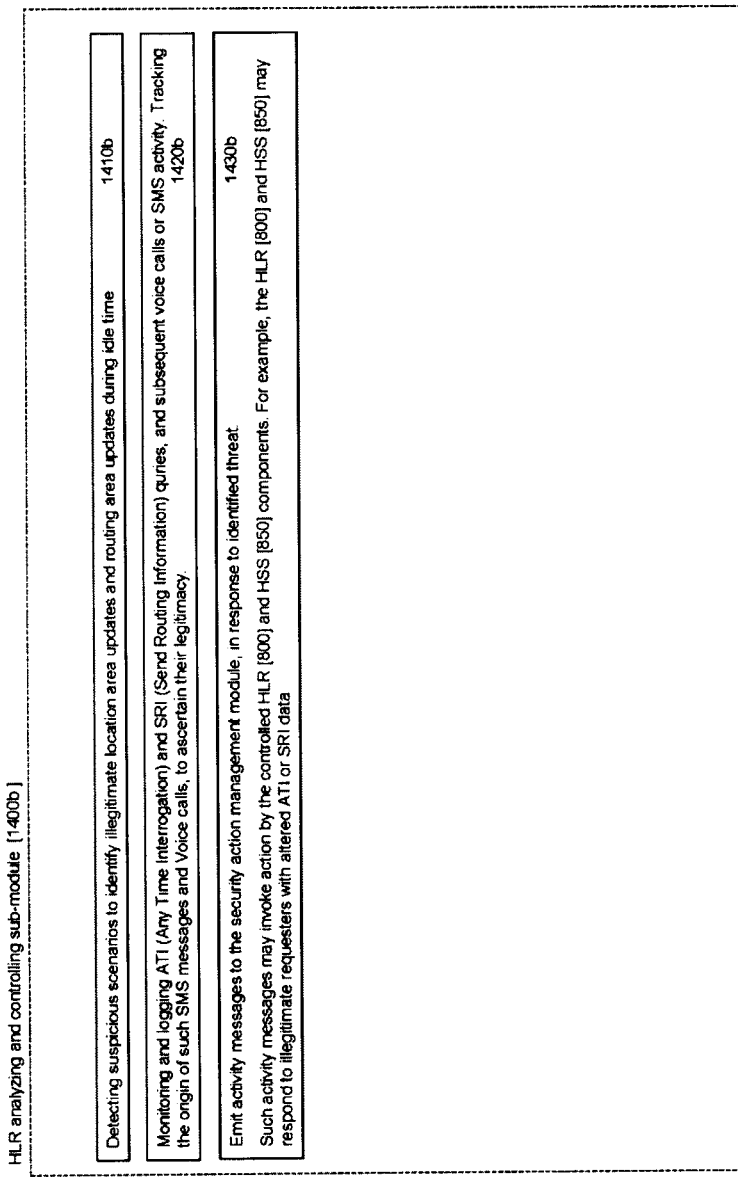
FIG. 10 depicts a flow diagram of the Home Location Register (HLR) analyzing and controlling sub-module [1400*b*]. This module is subsidiary to the data analysis module [1400]. It is configured to perform at least one of the following tasks.

FIG. 10 depicts a flow diagram of the HLR analyzing and controlling sub-module [1400b]. This module [1400b] is a subsidiary module of the data analysis module [1400], responsible for analyzing specific events related to the controlled HLR [800] and controlled HSS [850] modules. It is configured to perform at least one of the following tasks:

Monitoring, analyzing and logging ATI and SRI system queries;

Monitoring and analyzing location area updates during idle time (i.e. not during voice calls); and Monitoring and analyzing routing area updates during idle time (i.e. not during voice calls).

The HLR analyzing sub-module [1400b] detects suspicious scenarios to identify illegitimate location area updates and routing area updates during idle time (i.e. not during a voice call, step 1410b). Such scenarios may include, for example, idle-time movement between BTS that are inconsistent in respect to their geographical location (e.g. from a BTS that is located in London to one that is located in Paris).

The HLR analyzing sub-module [1400b] monitors and logs ATI and SRI system queries directed at the controlled HLR and controlled HSS modules, and subsequent voice calls or SMS activity. It tracks the origin of such SMS and voice calls control messages, to ascertain their legitimacy (step 1420b).

The HLR analyzing sub-module [1400b] may choose to respond to such illegitimate queries in one of several methods, according to its predefined configuration. It will consequently emit an activity message to the security action management module [1600] that will in turn carry out the chosen security action via the controlled HLR [800] and controlled HSS[850] components (step 1430b). For example, the HLR analyzing sub-module [1400b] may choose to:

emit altered location data, or altered identification data in response to respective queries;

emit a warning, to be displayed on the serviced subscriber UCD screen;

emit a warning, to be displayed at the administrative module 700; or ignore the said illegitimate query altogether.

FIG. 11 depicts a flow diagram of the security action management module [1600]. This module [1600] receives action messages from the data analysis module 1400, following the identification of a suspected threat (step 1610). These messages contain the security actions to be taken such as:

blocking or diverting messages;

responding to data queries with fictitious data;

logging suspicious events; or alerting subscribed users regarding suspicious occurrences on their UCD display.

The selection of security actions is based on:
the identified threat category;
suspected threat probability; and
the profile of service entitlements per each serviced subscriber.

The security action management module [1600] accesses the subscribers' database [1100b] to ascertain whether the specific serviced subscriber is entitled for the required security service, according to their profile of service entitlements (step 1620).

The security action management module [1600] may command the controlled GMSC [300] or controlled MME [350] to block suspicious voice-call related transactions (step 1630).

The security action management module [1600] may command the controlled GGSN [500] or controlled PGW [550] to block or manipulating suspicious data communication transactions (step 1640). This may include, for example:
blocking the download of suspicious data;
blocking the upload of data stored on the UCD, or originated from the UCD (e.g. a video stream); and
executing an end-point verification ('whois') network command.

The security action management module [1600] may command the controlled SMSC [400] to block or manipulate suspicious SMS/EMS/MMS/USSD communication transactions (step 1650).

The security action management module [1600] may command the controlled HLR [800] and controlled HSS [850] modules to apply actions such as (step 1660):
changing the CCN's HSS and HLR databases;
blocking incoming messages and voice calls; and
providing altered responses to ATI or SRI queries, to obfuscate UCD tracking attempts.

Reference is now made to FIG. 12, which is a simplified block diagram, depicting a two way communication channel between the UCD [10] and the security action management module [1600], According to some embodiments of the present invention.

According to these embodiments, the serviced subscriber's UCD further comprises a UCD Lifeline Module (ULM [20]), which may be implemented by any combination of hardware and software on the UCD [10].

According to one embodiment, the ULM [20] may be implemented as part of the UCD's SISE [30] (e.g. as a SIM applet). According to another embodiment, the ULM [20] may be implemented as an application or a service running in the UCD's [10] background.

The ULM [20] stores modules of instruction code which, when executed, configure the UCD [10] to maintain a continuous two-way communication channel with the security action management module [1600]. In this embodiment, the security action management module [1600] is also configured to maintain the said continuous two-way communication channel with the said serviced subscriber's ULM. The said continuous two-way communication channel is henceforth referred to as the "Lifeline" channel. According to one embodiment, the lifeline channel is implemented through switched packet data communication [40a] over the Internet [220], with SMS or USSD based communication fallback [40b] over the cellular network [200] (step 1670).

According to one embodiment, the ULM initiates said Lifeline communication [40a or 40b], and the security action management module [1600] responds to it. According to another embodiment, the security action management module [1600] initiates said Lifeline communication, and the ULM responds to it.

According to one embodiment, the CCN [100] obtains real-time information regarding the status and whereabouts of specific UCDs through the lifeline communication channel. This information is analyzed by the data analysis module
to avert security threats in real time. For example:
The ULM may convey properties of the PLMN in which the UCD is currently hosted. The data analysis module [1400] may use this information to identify hijacking attempts of the UCD from its home PLMN [200] or visited PLMN [200b] to other networks.
The ULM may convey information regarding an event of IRAT handover during a voice call. The data analysis module [1400] may use this information to identify illegitimate attempts to hijack the UCD to another network, or alter properties of UCD communication encryption.
The ULM may convey information regarding an event of BTS handover. The data analysis module [1400] may use this information to identify handovers that are inconsistent with BTS location and coverage (e.g. an instantaneous handover between a BTS in Paris and one in London).

As with all other types of identified security threats, the data analysis module [1400] will emit respective action messages to the security action module 1600, in order to avert the threats that have been identified via the lifeline communication channel.

According to one embodiment, the lifeline communication channel facilitates remote configuration of the UCD and/or the UCD SISE [30], as disclosed further below, in relation to the identity mediation module [1700].

In the event of a lifeline communication failure between the security action management module [1600] and a ULM, the security action management module [1600] may apply security actions such as:
Emitting a respective alert message to the administrative module [700];
Employing the identity mediation module [1700] in an attempt to change values of parameters of the UCD identity; and
Recording the events preceding the loss of lifeline communication in the events database [1100a] for further analysis.

The security action management module [1600] issues alerts to the administrative module 700, elaborating conditions and scenarios which have been identified as suspicious, and actions that have been taken to avert these suspected threats (step 1680).

FIG. 13 depicts the flow diagram of the identity mediation module [1700].

The identity mediation module [1700] connects with the ULM of specific serviced subscribers' UCDs via the security action module [1600] and the lifeline communication channel (step 1710), i.e. either through switched data packets [40a] over the Internet 220 or through SMS or USSD messages [40b] over the cellular network.

According to one embodiment of the present invention, the identity mediation module [1700] may assign altered values to identity parameters (e.g.: IMSI, IMEI, IMEISV, MSISDN, Ki, Kc, TMSI, PTMSI, TLLI, ESN) stored on any serviced subscriber UCD (step 1720). According to this embodiment, the identity mediation module (1700) communicates the said required alteration of identity parameter values through the Lifeline communication channel to the ULM [20] on the serviced subscribers' UCD [10]. The ULM [20] may either:

Propagate the required alteration to the SISE [30], to apply the required alteration of identity parameter values for parameters stored on the SISE [30] (e.g.: IMSI, Ki, Kc), or Apply the required alteration to other UCD identity parameters stored elsewhere on the UCD [10].

According to one embodiment, the said alteration of UCD identity parameter values may be invoked according to various configurations, e.g.:

Automatically, according to a time based trigger;
locally on the UCD [10], according to any logic preconfigured on the ULM [20] or SISE [30];
locally by the ULM [20] or SISE [30], in response to a failure to receive Lifeline communication;
remotely, according to any logic preconfigured on the identity mediation module [1700];
remotely by the identity mediation module [1700], in response to failure to receive Lifeline communication;
remotely by the identity mediation module [1700], in response to an activity message from the data analysis module, following an event on the hosting PLMN (e.g. the UCD [10] will respond with a different IMSI each time it is requested to identify);
remotely by the identity mediation module [1700], in response to an activity message from the data analysis module, following an identified suspected threat, including IMSI catcher and Man-in-the-Middle (MitM) attacks; or
any combination of the above.

The identity mediation module [1700] mediates between the altered UCD [10] identity parameter values and the original identity parameter values per each communication (step 1730), and routes the UCD [10] user communication with the hosting network [200] or visited network [200b] using the altered identity. This mediation provides the CCN [100] complete control over all forms of communication between the hosting PLMN [200] or visited PLMN [200b] and specific serviced subscriber UCDs, for example:

In the event of an identified MitM or IMSI catcher attack, aimed at phishing data from a target UCD, the system may choose to alter parameters of the UCD's identity, to avert the phishing attempt.

In the event of having the details of the UCD identity compromised (e.g. during connection to a Wi-Fi network via a non-protected cellular router), altering of UCD identity parameters will avert any future cyber attacks on the target UCD that are based on the said compromised identity parameters.

According to one embodiment, serviced subscribers' ULMs are configured to possess a set of fallback identity parameter values (e.g. fallback IMSI value, fallback IMEI value etc.). Upon the event of a lifeline communication failure between the security action module [1600] and the ULM of a serviced subscriber's UCD (e.g. in the case of the UCD being hijacked to another network), the ULM will invoke an alteration of UCD identity parameters to the said fallback values. The UCD will revert to using the set of fallback parameter values, and will thus be re-introduced to the CCN [100] bearing the said fallback identity parameter values.

According to one embodiment, the ULM will invoke a UCD restarted following said alteration of UCD identity parameters, in cases that require such a restart to enforce the usage of the altered identity parameters by the UCD.

FIG. 14 depicts the flow diagram of the administrative module 700. This module provides an interface for configuring the CCNs 100 system (step 710).

The administrative module [700] provides an interface to configure the profile of serviced subscribers. (step 720). The said profile of serviced subscribers incorporates various properties, including at least one of:

The number and identity of organizational accounts that incorporate multiple subscribers, for which the CCN [100] provides security services;

The identity of individual serviced subscribers, incorporated within each organizational account;

Authorization level attributes per each organizational account or subscriber account (e.g.: whether the CCN [100] is authorized to block communication for specific serviced subscribers);

The profile of suspicious scenarios and threat categories per each organizational account or subscriber account (e.g.: whether the CCN [100] is configured to detect and analyze UCD tracking scenarios for serviced subscribers within a specific organizational account); and The profile of each serviced subscriber's service entitlements (e.g.: security actions that would be taken in response to identified threats).

The administrative module 700 provides an interface to configure various properties of the CCN [100] (step 730), such as:

The profile of suspicious scenarios and threat analysis; and

The instantiation of various CCN [100] modules.

The administrative module 700 provides an interface to set up and receive alerts regarding events and actions that have taken place within the CCN [100] (step 740).

According to some embodiments, the administrative module 700 provides an interface for querying, monitoring and editing the data resident on the system's databases (i.e. the events DB, subscribers DB and threats DB) (step 750). This data relates to all aspects of the CCN [100] system. Examples for such actions are:

Altering the content of a specific serviced subscriber's SISE (e.g. properties of the UCD identity parameters), via the lifeline communication channel;

Changing the properties of specific threats and threat categories stored on the threats database [1100c] and;

Changing the configuration of CCN [100] modules (e.g. instantiating or omitting a specific module within the CCN [100]).

The administrative module 700 provides an interface for producing reports regarding events, subscribers and threats that are stored within the respective databases [100] (step 760).

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A system for providing security services, for securing the privacy of cellular network subscribers and the security of data stored on the said subscribers' User Cellular Devices (UCDs), said system comprising:
   at least one non-transitory computer readable storage device and one or more processors operatively coupled to the storage device on which are stored modules of instruction code which when executed by said one or more processors implements a Controlled Cellular Network (CCN), interfacing a cellular Public Land Mobile Network (PLMN), said PLMN hosting a plurality of cellular subscribers;
   wherein said CCN provides said security services to "serviced subscribers";
   wherein said CCN encapsulates communication between UCD of said serviced subscribers and the hosting PLMN, said communication including at least part of: control, signaling, SMS and data communications;

wherein said CCN is configured to monitor and analyze parameters and characteristics of said encapsulated communication in real time or in relation to historically acquired data, including at least one of: time patterns, volumes, destination address, source address, content and context;

wherein said CCN is configured to identify statistic deviations exceeding predefined thresholds, based on said analysis of parameters and characteristics of said encapsulated communication;

wherein said CCN is configured to identify the occurrence of predefined suspicious events and scenarios, based on said analysis of said encapsulated communication;

wherein said CCN is configured to identify security threats to the privacy of said serviced subscribers and to the data stored on their UCD and determine said threats' category and probability, based on said analysis of encapsulated communication;

wherein the said CCN is configured to respond to said security threats in real time or in near-real time and take active measures to avert the said suspected threats;

wherein said active measures including at least one of: blocking or diverting communication, alerting serviced subscribers and/or system administrators, responding to system queries with altered data, and logging of suspicious events and scenarios;

wherein application of said active measures depends on the category of identified security threat, the identified threat's probability, and the serviced subscriber's profile;

wherein said CCN comprises at least one of:
  controlled module(s), configured to complement the functionality of respective elements of the hosting cellular PLMN;
  a security center module, configured to perform at least one of instantiation, configuration, monitoring, analysis and management of the functionality of each of said controlled modules; and
  an administrative module, configured to interface said security center module, and provide an administrator interface for at least one of:
    instantiating controlled modules of one or more CCNs;
    configuring said controlled modules of said one or more CCNs, to serve serviced subscribers of the hosting cellular PLMN;
    presenting alerts regarding the functionality of the CCN and events within the hosting cellular PLMN;
    extracting reports regarding the functionality of the CCN and events within the hosting cellular PLMN;

wherein the said security center module comprises at least one of the following modules:
  a probe interface module, configured to probe each of the said controlled modules within the CCN, and accumulate data regarding transactions, events and scenarios occurring on the hosing PLMN and data regarding communication between elements of the CCN and the hosting PLMN;
  a data analysis module, configured to perform at least one of:
    obtaining the data accumulated by the said probe interface module;
    analyzing parameters and characteristics of said encapsulated communication in real time or in near-real time, including at least one of: time patterns, volumes, destination address, source address, content and context;
    identifying statistic deviations exceeding predefined thresholds;
    analyzing accumulated historical data, pertaining to parameters and characteristics of said encapsulated communication;
    identifying the occurrence of predefined suspicious events and scenarios on the hosing PLMN based on said analysis;
    identifying security threats to the privacy of serviced subscribers and data stored on their UCD based on said analysis;
    emitting activity messages to other controlled modules of the CCN to avert the said identified security threats, and emitting alert messages to said administrative module and/or UCD to notify against said identified security threats;
    maintaining an events' database;
  a security action management module configured to perform at least one of:
    receiving activity messages from the data analysis module;
    obtaining parameters of served subscriber's profile from a subscribers database;
    interfacing and commanding controlled modules within the CCN to carry out security actions that are required to avert the said identified security threat, according to the category of identified threat, the identified threat's probability, and the serviced subscriber's profile; and
  a threats management module, configured to manage and maintain a database of the security threats encountered during the activity of the CCN;

further comprising a UCD Lifeline Module (ULM) embedded within said serviced subscribers' UCD, on which are stored modules of instruction code, which when executed by the ULM, configure the UCD to initiate lifeline communication to the security action management module or respond to lifeline communication from the security action management module;

wherein:
  the said security action management module is configured to initiate lifeline communication to the UCD or respond to lifeline communication from the UCD;
  failure of reception of Lifeline communication on the security action management module side is reported to the data analysis module as real-time indication of an attempt to hijack the UCD from the hosting PLMN; and
  failure of reception of Lifeline communication on the ULM invokes security actions on the UCD side, said actions including at least one of: alerting the user regarding failure of lifeline reception and altering at least one of the UCD's identity parameters.

2. The system of claim 1, wherein the CCN provides serviced subscribers UCDs at least part of the following functionality:
Mobility Management (MM) of the user;
Short Message Services (SMS);
Supplementary Services (SS);
Intelligent Networks (IN) aspects;
Handling of user data communication;
Signaling of incoming calls and SMS;
Incoming and outgoing USSD; and
All CAMEL transactions.

3. The system of claim 1, wherein said at least one controlled modules comprises a controlled Home Location Register (HLR) module (800) and/or controlled Home Subscriber Server (HSS) module, configured, monitored and controlled by the said security center module, to perform at least one of the following:
- withholding a database upon which information pertaining to said serviced subscribers is kept;
- respectively complementing the functionality of HLR and/or HSS modules of the hosting cellular PLMN system (200) from within the CCN;
- providing data to the security center module regarding system access to the HSS/HLR databases, Any Time Interrogation (ATI) queries and Send Routing Information (SRI) queries; and
- acting upon commands from the security center module by performing at least one of: applying changes to the CCN's HSS and HLR databases, blocking incoming messages and voice calls, and providing altered responses to ATI and SRI system queries.

4. The system of claim 1, wherein said at least one controlled modules comprises a controlled GMSC and/or controlled MME module, configured, monitored and controlled by the said security center module, to perform at least one of the following:
- respectively complementing the functionality of GMSC (Gateway Mobile Switching Center) and/or MME (Mobility Management Entity) modules of the hosting cellular PLMN from within the CCN;
- routing cellular calls between serviced subscribers of the CCN and the hosting PLMN;
- providing data to the security center module regarding hosting PLMN control messages; and
- acting upon commands from the security center module by blocking suspicious voice-call related messages.

5. The system of claim 1, wherein said at least one controlled modules comprises a controlled GGSN module and/or controlled PGW module, configured, monitored and controlled by the said security center module, to perform at least one of the following:
- respectively complementing the functionality of GGSN (Gateway GPRS Support Node) and/or PGW (Packet Data Network Gateway) modules of the hosting cellular PLMN system from within the CCN;
- routing packet switched data between the CCN and external packet switched networks, including at least one of the Internet, IoT (Internet of Things) devices, M2M networks and connected cars data networks;
- providing data to the security center module regarding switched data packets transactions over the PLMN; and
- acting upon commands from the security center module by performing at least one of: blocking the download of suspicious data, blocking the upload of data stored on the UCD, or originated from the UCD, the UCD camera and the UCD microphone, and executing an end-point verification ('whois') network command.

6. The system of claim 1, wherein said at least one controlled modules comprises a controlled Short Messaging Service Center (SMSC) module, configured, monitored and controlled by the said security center module, to perform at least one of the following:
- complementing the functionality of the SMSC module of the hosting cellular PLMN system from within the CCN;
- routing Short Messages (SMS, EMS, MMS, USSD) between the CCN and the hosting PLMN;
- providing data to the security center module regarding Short Messaging (SMS, EMS, MMS, USSD) control and data messages over the PLMN; and
- acting upon commands from the security center module by blocking or manipulating suspicious SMS, EMS, MMS and USSD communication transactions.

7. The system of claim 1, wherein at least one component of the CCN is implemented as a service, and executed on the same physical machines as the home PLMN or hosting PLMN hardware components.

8. The system of claim 1, wherein the data analysis module is further configured to:
- monitor incoming and outgoing communication pertaining to specific mobile applications executing on the UCD;
- detect deviations within predefined threshold in said communication from expected communication patterns of said specific mobile applications, wherein said communication patterns include at least one of: source address, destination address, communication volume, communication patterns and communication timing; and
- analyze said detected deviations to identify illegitimate activity of mobile applications.

9. A system-for providing security services, for securing the privacy of cellular network subscribers and the security of data stored on the said subscribers' User Cellular Devices (UCDs), said system comprising:
- at least one non-transitory computer readable storage device and one or more processors operatively coupled to the storage device on which are stored modules of instruction code which when executed by said one or more processors implements a Controlled Cellular Network (CCN), interfacing a cellular Public Land Mobile Network (PLMN), said PLMN hosting a plurality of cellular subscribers;
- wherein said CCN provides said security services to "serviced subscribers";
- wherein said CCN encapsulates communication between UCD of said serviced subscribers and the hosting PLMN, said communication including at least part of: control, signaling, SMS and data communications;
- wherein said CCN is configured to monitor and analyze parameters and characteristics of said encapsulated communication in real time or in relation to historically acquired data, including at least one of: time patterns, volumes, destination address, source address, content and context;
- wherein said CCN is configured to identify statistic deviations exceeding predefined thresholds, based on said analysis of parameters and characteristics of said encapsulated communication;
- wherein said CCN is configured to identify the occurrence of predefined suspicious events and scenarios, based on said analysis of said encapsulated communication;
- wherein said CCN is configured to identify security threats to the privacy of said serviced subscribers and to the data stored on their UCD and determine said threats' category and probability, based on said analysis of encapsulated communication;
- wherein the said CCN is configured to respond to said security threats in real time or in near-real time and take active measures to avert the said suspected threats;
- wherein said active measures including at least one of: blocking or diverting communication, alerting serviced subscribers and/or system administrators, responding to system queries with altered data, and logging of suspicious events and scenarios;

wherein application of said active measures depends on the category of identified security threat, the identified threat's probability, and the serviced subscriber's profile;

wherein said CCN comprises at least one of:
controlled module(s), configured to complement the functionality of respective elements of the hosting cellular PLMN;
a security center module, configured to perform at least one of instantiation, configuration, monitoring, analysis and management of the functionality of each of said controlled modules; and
an administrative module, configured to interface said security center module, and provide an administrator interface for at least one of:
instantiating controlled modules of one or more CCNs;
configuring said controlled modules of said one or more CCNs, to serve serviced subscribers of the hosting cellular PLMN;
presenting alerts regarding the functionality of the CCN and events within the hosting cellular PLMN;
extracting reports regarding the functionality of the CCN and events within the hosting cellular PLMN;

wherein the said security center module comprises at least one of the following modules:
a probe interface module, configured to probe each of the said controlled modules within the CCN, and accumulate data regarding transactions, events and scenarios occurring on the hosing PLMN and data regarding communication between elements of the CCN and the hosting PLMN;
a data analysis module, configured to perform at least one of:
obtaining the data accumulated by the said probe interface module;
analyzing parameters and characteristics of said encapsulated communication in real time or in near-real time, including at least one of: time patterns, volumes, destination address, source address, content and context;
identifying statistic deviations exceeding predefined thresholds;
analyzing accumulated historical data, pertaining to parameters and characteristics of said encapsulated communication;
identifying the occurrence of predefined suspicious events and scenarios on the hosing PLMN based on said analysis;
identifying security threats to the privacy of serviced subscribers and data stored on their UCD based on said analysis;
emitting activity messages to other controlled modules of the CCN to avert the said identified security threats, and emitting alert messages to said administrative module and/or UCD to notify against said identified security threats;
maintaining an events' database;
a security action management module configured to perform at least one of:
receiving activity messages from the data analysis module;
obtaining parameters of served subscriber's profile from a subscribers database;
interfacing and commanding controlled modules within the CCN to carry out security actions that are required to avert the said identified security threat, according to the category of identified threat, the identified threat's probability, and the serviced subscriber's profile;
a threats management module, configured to manage and maintain a database of the security threats encountered during the activity of the CCN;
further comprising a UCD Lifeline Module (ULM) embedded within said serviced subscribers' UCD, on which are stored modules of instruction code, which when executed by the ULM, configure the UCD to initiate lifeline communication to the security action management module or respond to lifeline communication from the security action management module;
wherein:
said ULM is configured to send to the said security action management module real-time information regarding the status and whereabouts of the UCD through the Lifeline communication channel, said information including at least one of: properties of the hosting PLMN, events of IRAT handover during voice calls, and events of BTS handover during voice calls;
said real-time information is propagated from the security action management module to the data analysis module; and
the data analysis module is configured to analyze said information, and identify at least one of following suspicious events and scenarios:
illegitimate IRAT handover;
illegitimate BTS handover;
hijacking attempts of the UCD from its home PLMN or visited PLMN to other networks; and
illegitimate altering of UCD communication encryption properties.

10. A system for providing security services, for securing the privacy of cellular network subscribers and the security of data stored on the said subscribers' User Cellular Devices (UCDs), said system comprising:
at least one non-transitory computer readable storage device and one or more processors operatively coupled to the storage device on which are stored modules of instruction code which when executed by said one or more processors implements a Controlled Cellular Network (CCN), interfacing a cellular Public Land Mobile Network (PLMN), said PLMN hosting a plurality of cellular subscribers;
wherein said CCN provides said security services to "serviced subscribers";
wherein said CCN encapsulates communication between UCD of said serviced subscribers and the hosting PLMN, said communication including at least part of: control, signaling, SMS and data communications;
wherein said CCN is configured to monitor and analyze parameters and characteristics of said encapsulated communication in real time or in relation to historically acquired data, including at least one of: time patterns, volumes, destination address, source address, content and context;
wherein said CCN is configured to identify statistic deviations exceeding predefined thresholds, based on said analysis of parameters and characteristics of said encapsulated communication;

wherein said CCN is configured to identify the occurrence of predefined suspicious events and scenarios, based on said analysis of said encapsulated communication;

wherein said CCN is configured to identify security threats to the privacy of said serviced subscribers and to the data stored on their UCD and determine said threats' category and probability, based on said analysis of encapsulated communication;

wherein the said CCN is configured to respond to said security threats in real time or in near-real time and take active measures to avert the said suspected threats;

wherein said active measures including at least one of: blocking or diverting communication, alerting serviced subscribers and/or system administrators, responding to system queries with altered data, and logging of suspicious events and scenarios;

wherein application of said active measures depends on the category of identified security threat, the identified threat's probability, and the serviced subscriber's profile;

wherein said CCN comprises at least one of:
controlled module(s), configured to complement the functionality of respective elements of the hosting cellular PLMN;
a security center module, configured to perform at least one of instantiation, configuration, monitoring, analysis and management of the functionality of each of said controlled modules; and
an administrative module, configured to interface said security center module, and provide an administrator interface for at least one of:
instantiating controlled modules of one or more CCNs;
configuring said controlled modules of said one or more CCNs, to serve serviced subscribers of the hosting cellular PLMN;
presenting alerts regarding the functionality of the CCN and events within the hosting cellular PLMN;
extracting reports regarding the functionality of the CCN and events within the hosting cellular PLMN;

wherein the said security center module comprises at least one of the following modules:
a probe interface module, configured to probe each of the said controlled modules within the CCN, and accumulate data regarding transactions, events and scenarios occurring on the hosing PLMN and data regarding communication between elements of the CCN and the hosting PLMN;
a data analysis module, configured to perform at least one of:
obtaining the data accumulated by the said probe interface module;
analyzing parameters and characteristics of said encapsulated communication in real time or in near-real time, including at least one of: time patterns, volumes, destination address, source address, content and context; and
identifying statistic deviations exceeding predefined thresholds;
analyzing accumulated historical data, pertaining to parameters and characteristics of said encapsulated communication;
identifying the occurrence of predefined suspicious events and scenarios on the hosing PLMN based on said analysis;
identifying security threats to the privacy of serviced subscribers and data stored on their UCD based on said analysis;
emitting activity messages to other controlled modules of the CCN to avert the said identified security threats, and emitting alert messages to said administrative module and/or UCD to notify against said identified security threats;
maintaining an events' database;
a security action management module configured to perform at least one of:
receiving activity messages from the data analysis module;
obtaining parameters of served subscriber's profile from a subscribers database;
interfacing and commanding controlled modules within the CCN to carry out security actions that are required to avert the said identified security threat, according to the category of identified threat, the identified threat's probability, and the serviced subscriber's profile;
a threats management module, configured to manage and maintain a database of the security threats encountered during the activity of the CCN;
further comprising a UCD Lifeline Mobdule (ULM) embedded within said serviced subscribers' UCD, on which are stored modules of instruction code, which when executed by the ULM, configure the UCD to initiate lifeline communication to the security action management module or respond to lifeline communication from the security action management module;
wherein:
said security center module further comprises an identity mediation module, configured to dynamically alter the value of one or more serviced subscribers' UCD identity parameters, said identity parameters including at least one of IMSI, IMEI, IMEISV, MSISDN, Ki, Kc, TMSI, PTMSI, TLLI, ESN;
said identity mediation module communicates the said alteration of identity parameter values through said Lifeline communication channel to the ULM on the serviced subscribers' UCD;
said ULM module is configured to receive said required alteration of identity parameter values through said lifeline communication channel;
said ULM module is configured to propagate required alteration of values of identity parameters stored on the Subscriber Identity Storage Element (SISE), to said SISE, said parameters including at least one of IMSI, Ki and Kc;
said SISE is configured to apply said required alteration of values to identity parameter stored on the SISE, said parameters including at least one of IMSI, Ki and Kc;
said ULM module is configured to apply changes to values of UCD identity parameter stored on the UCD; and
said identity mediation module is configured to dynamically mediate between said altered UCD identity parameter values and the original UCD identity parameters, thus facilitating the routing of the UCD communication with the hosting PLMN or visited network using the altered identity parameters.

11. The system of claim 9, wherein said alteration of one or more UCD identity parameter values may be invoked:

according to a time based trigger;
locally on the UCD, according to any logic preconfigured on the ULM or SISE;
locally by the ULM or SISE, in response to a failure to receive Lifeline communication;
remotely, according to any logic preconfigured on the identity mediation module;
remotely by the identity mediation module, in response to failure to receive Lifeline communication;
remotely by the identity mediation module, in response to an event on the hosting PLMN;
remotely by the identity mediation module, in response to an activity message from the data analysis module, following an identified suspected threat, including IMSI catcher and Man-in-the-Middle (MitM) attacks; or
any combination of the above.

12. The system of claim 9, wherein serviced subscribers' ULMs are configured to possess a set of fallback identity parameter values, whereupon the event of a lifeline communication failure between the security action module and the ULM of a serviced subscriber's UCD:
the ULM will invoke an alteration of UCD identity parameter values to the said fallback values;
the UCD will revert to using said set of fallback parameter values, and thus will be re-introduced to the CCN bearing the said fallback UCD identity parameter values; and
the ULM will optionally restart the UCD in cases that require such a restart, in order to ensure the enforcement of said alteration of identity parameter values on the UCD.

13. A method for providing security services, for securing the privacy of cellular network subscribers and the security of data stored on the said subscribers' User Cellular Devices (UCDs), said method implemented by one or more processors operatively coupled to a non-transitory computer readable storage device, on which are stored modules of instruction code that when executed cause the one or more processors to perform:
interfacing a cellular Public Land Mobile Network (PLMN) hosting a plurality of cellular subscribers, with a Controlled Cellular Network (CCN);
providing security services to "serviced subscribers" by said CCN;
encapsulating communication between the UCDs of said serviced subscribers and hosting PLNM by said CCN, said communication including at least part of: control, signaling, SMS and data communications;
monitoring and analyzing parameters and characteristics of said encapsulated communication in real time or in relation to historically acquired data by the CCN, said parameters and characteristics including at least one of: time patterns, volumes, destination address, source address, content and context;
identifying by the CCN statistic deviations in said parameters and characteristics exceeding predefined thresholds, based on said analysis of said encapsulated communication-;
identifying by the CCN occurrence of predefined suspicious events and scenarios, based on said analysis of said encapsulated communication;
identifying by the CCN security threats to the privacy of said serviced subscribers, and to the data stored on their UCDs, and determining said threats' category and probability, based on said analysis of encapsulated communication;
responding to said security threats in real time or in near-real time, and taking active measures to avert the said suspected threats, said active measures including at least one of: blocking or diverting communication, alerting serviced subscribers and/or system administrators, responding to system queries with altered data, and logging of suspicious events and scenarios;
wherein application of said active measures depends on the category of identified threat, the identified threat's probability, and the serviced subscriber's profile;
instantiating at least one controlled module, within the CCN, configured t complement the functionality of respective elements of the hosting cellular PLMN;
configuring said controlled modules by a security center module;
monitoring, analyzing and managing of the functionality of each of said controlled modules comprising the CCN by the said security center module;
providing an administrative interface, by means of an administrative module operatively coupled to said security center module, enabling an administrator to:
instantiate controlled modules of one or more CCNs;
configure the components of one or more CCNs to serve serviced subscribers of the hosting cellular PLMN;
present alerts regarding the functionality of the CCN and its components;
present alerts regarding the occurrence of events and scenarios within the hosting cellular PLMN; and
extract reports regarding the functionality of the CCN and events within the hosting cellular PLMN;
probing each of the said controlled modules within the CCN, and accumulating data regarding transactions, events and scenarios occurring on the hosing PLMN and data regarding communication between elements of the CCN and the hosting PLMN by a probe interface module;
propagating the data accumulated by the said probe interface module to a data analysis module;
analyzing by the said data analysis module parameters and characteristics of said encapsulated communication in real time or in near-real time, said parameters including at least one of: time patterns, volumes, destination address, source address, content and context;
analyzing statistic deviations in the values of said parameters and characteristics exceeding predefined thresholds by the said data analysis module;
analyzing accumulated historical data, pertaining to said parameters and characteristics of said encapsulated communication by the said data analysis module;
identifying the occurrence of predefined suspicious events and scenarios on the hosing PLMN based on said analysis by the data analysis module; identifying security threats to the privacy of serviced subscribers and data stored on their UCD based on said analysis by the data analysis module;
emitting activity messages from the data analysis module to other controlled modules of the CCN to avert the said identified security threats, and/or emitting alert messages to said administrative module and/or UCD to notify against said identified security threats;
maintaining an events' database, withholding important events and scenarios that occurred within the CCN and/or hosting PLMN;
receiving activity messages from said data analysis module to a security action management module;

obtaining parameters of served subscriber's profile from a subscribers database;

commanding controlled modules by the security action management module, to carry out security actions as dictated by said activity messages from said data analysis module, and avert said identified security threats, said security actions depending on: category of identified threat, the identified threat's probability, and the serviced subscriber's profile;

maintaining a database of the security threats encountered during the activity of the CCN;

initiating lifeline communication by said security action management module to the UCD, or responding to lifeline communication from the UCD by the security action management module;

reporting failure of reception of lifeline communication on the security action management module side to the data analysis module as real-time indication of an attempt to hijack the UCD from the hosting PLMN; and invoking security actions by the UCD in response to failure of reception of lifeline communication on the ULM side, said actions including at least one of: alerting the user regarding said failure of lifeline reception and altering at least one of the UCD's identity parameters.

14. The method of claim 13, further providing serviced subscribers UCDs at least part of the following functionality by the CCN:

Mobility Management (MM) of the user;
Short Message Services (SMS);
Supplementary Services (SS);
Intelligent Networks (IN) aspects;
Handling of user data communication;
Signaling of incoming calls and SMS;
Incoming and outgoing USSD; and
All CAMEL transactions.

15. The method of claim 13, further comprising the steps of:

instantiating a controlled Home Location Register (HLR) module and/or controlled Home Subscriber Server (HSS) module, configured, monitored and controlled by the said security center module;

maintaining by said controlled HLR and/or controlled HSS module a database upon which information pertaining to said serviced subscribers is kept;

complementing the functionality of HLR (Home Location Register) and/or HSS (Home Subscriber Server) modules of the hosting cellular PLMN system from within the CCN, respectively by said controlled HLR and/or controlled HSS module;

providing data to the security center module regarding system access to the HSS/HLR databases, ATI queries and SRI queries by said controlled HLR and/or controlled HSS module; and acting upon commands from the security center module by said controlled HLR and/or controlled HSS module, by performing at least one of:

applying changes to the CCN's HSS and HLR databases;

blocking incoming messages and voice calls; and providing altered responses to Any Time Interrogation (ATI) and Send Routing Information (SRI) system queries.

16. The method of claim 13, further comprising the steps of:

instantiating a controlled Gateway Mobile Switching Center (GMSC) module, and/or controlled Mobility Management Entity module (MME) module, configured, monitored and controlled by the said security center module;

complementing the functionality of GMSC and/or MME modules of the hosting cellular PLMN from within the CCN, respectively by said controlled GSMC module and/or controlled MME module;

routing cellular calls between serviced subscribers of the CCN and the hosting PLMN by said controlled GSMC module and/or controlled MME module;

providing data to the security center module regarding hosting PLMN control messages by said controlled GSMC module and/or controlled MME module; and blocking suspicious voice-call related messages by said controlled GSMC module and/or controlled MME module, upon commands from the security center module.

17. The method of claim 13, further comprising the steps of:

instantiating a controlled Gateway GPRS Support Node (GGSN) module and/or controlled Packet Data Network Gateway (PGW) module, configured, monitored and controlled by the said security center module;

complementing the functionality of GGSN and/or PGW modules of the hosting cellular PLMN system from within the CCN (100), respectively by the said controlled GGSN module and/or controlled PGW module;

routing packet switched data between the CCN and external packet switched networks, including at least one of the Internet, IoT (Internet of Things) devices M2M (Machine to Machine) networks and connected cars data networks by the said controlled GGSN module and/or controlled PGW module;

providing data to the security center module regarding switched data packets transactions over the PLMN by the said controlled GGSN module and/or controlled PGW module; and acting upon commands from the security center module by the said controlled GGSN module and/or controlled PGW module, by performing at least one of:

blocking the download of suspicious data;
blocking the upload of data stored on the UCD, or originated from the UCD, the UCD camera and the UCD microphone; and
executing an end-point verification ('whois') network command.

18. The method of claim 13, further comprising the steps of:

instantiating a controlled Short Messaging Service Center (SMSC) module, configured, monitored and controlled by the said security center module;

complementing the functionality of the SMSC of the hosting cellular PLMN system from within the CCN (100) by the said controlled SMSC module;

routing Short Messages (SMS, EMS, MMS, USSD) between the CCN and the hosting PLMN by the said controlled SMSC module;

providing data to the security center module regarding Short Messaging (SMS, EMS, MMS, USSD) control and data messages over the PLMN by the said controlled SMSC module; and blocking or manipulating suspicious SMS, EMS, MMS and USSD communication transactions by the said controlled SMSC module, upon commands from the security center module.

19. The method of claim 13, wherein at least one component of the CCN is implemented as a service, and executed on the same physical machines as the home PLMN or hosting PLMN hardware components.

20. The method of claim 13, further comprising the steps of:
monitoring of incoming and outgoing communication pertaining to specific mobile applications executing on the UCD by the data analysis module;
detecting deviations within predefined threshold in said communication from expected communication patterns of said specific mobile applications, by the data analysis module, wherein said communication patterns include at least one of: source address, destination address, communication volume, communication patterns and communication timing; and
analyzing said detected deviations to identify illegitimate activity of mobile applications.

21. The method of claim 13, further comprising the step of configuring the UCD Lifeline Module (ULM) embedded within said serviced subscribers' UCD to initiate lifeline communication to the security action management module or respond to lifeline communication from the security action management module.

22. A method for providing security services, for securing the privacy of cellular network subscribers and the security of data stored on the said subscribers' User Cellular Devices (UCDs), said method implemented by one or more processors operatively coupled to a non-transitory computer readable storage device, on which are stored modules of instruction code that when executed cause the one or more processors to perform:
interfacing a cellular Public Land Mobile Network (PLMN) hosting a plurality of cellular subscribers, with a Controlled Cellular Network (CCN);
providing security services to "serviced subscribers" by said CCN;
encapsulating communication between the UCDs of said serviced subscribers and hosting PLMN by said CCN, said communication including at least part of: control, signaling, SMS and data communications;
monitoring and analyzing parameters and characteristics of said encapsulated communication in real time or in relation to historically acquired data by the CCN, said parameters and characteristics including at least one of: time patterns, volumes, destination address, source address, content and context;
identifying by the CCN statistic deviations in said parameters and characteristics exceeding predefined thresholds, based on said analysis of said encapsulated communication;
identifying by the CCN occurrence of predefined suspicious events and scenarios, based on said analysis of said encapsulated communication;
identifying by the CCN security threats to the privacy of said serviced subscribers, and to the data stored on their UCDs, and determining said threats' category and probability, based on said analysis of encapsulated communication;
responding to said security threats in real time or in near-real time, and taking active measures to avert the said suspected threats, said active measures including at least one of: blocking or diverting communication, alerting serviced subscribers and/or system administrators, responding to system queries with altered data, and logging of suspicious events and scenarios;
wherein application of said active measures depends on the category of identified threat, the identified threats probability, and the serviced subscriber's profile;
instantiating at least one controlled module, within the CCN, configured to complement the functionality of respective elements of the hosting cellular PLMN;
configuring said controlled modules by a security center module;
monitoring, analyzing and managing of the functionality of each of said controlled modules comprising the CCN by the said security center module;
providing an administrative interface, by means of an administrative module operatively coupled to said security center module, enabling an administrator to:
instantiate controlled modules of one or more CCNs;
configure the components of one or more CCNs to serve serviced subscribers of the hosting cellular PLMN;
present alerts regarding the functionality of the CCN and its components; present alerts regarding the occurrence of events and scenarios within the hosting cellular PLMN; and
extract reports regarding the functionality of the CCN and events within the hosting cellular PLMN;
probing each of the said controlled modules within the CCN, and accumulating data regarding transactions, events and scenarios occurring on the hosing PLMN and data regarding communication between elements of the CCN and the hosting PLMN by a probe interface module;
propagating the data accumulated by the said probe interface module to a data analysis module;
analyzing by the said data analysis module parameters and characteristics of said encapsulated communication in real time or in near-real time, said parameters including at least one of: time patterns, volumes, destination address, source address, content and context;
analyzing statistic deviations in the values of said parameters and characteristics exceeding predefined thresholds by the said data analysis module;
analyzing accumulated historical data, pertaining to said parameters and characteristics of said encapsulated communication by the said data analysis module;
identifying the occurrence of predefined suspicious events and scenarios on the hosing PLMN based on said analysis by the data analysis module;
identifying security threats to the privacy of serviced subscribers and data stored on their UCD based on said analysis by the data analysis module;
emitting activity messages from the data analysis module to other controlled modules of the CCN to avert the said identified security threats, and/or emitting alert messages to said administrative module and/or UCD to notify against said identified security threats;
maintaining an events' database, withholding important events and scenarios that occurred within the CCN and/or hosting PLMN;
receiving activity messages from said data analysis module to a security action management module;
obtaining parameters of served subscriber's profile from a subscribers database;
commanding controlled modules by the security action management module, to carry out security actions as dictated by said activity messages from said data analysis module, and avert said identified security threats, said security actions depending on: category of identified threat, the identified threat's probability, and the serviced subscriber's profile;
maintaining a database of the security threats encountered during the activity of the CCN;

sending to the said security action management module
real-time information by the ULM, regarding the status
and whereabouts of the UCD through the lifeline
communication channel, said information including at
least one of: properties of the hosting PLMN, events of
IRAT handover during voice calls, and events of BTS
handover during voice calls;
propagating said real-time information from the security
action management module to the data analysis module; and
analyzing said information by the data analysis module,
and identifying at least one of following suspicious
events and scenarios:
illegitimate IRAT handover;
illegitimate BTS handover;
hijacking attempts of the UCD from its home PLMN or
visited PLMN to other networks; and
illegitimate altering of UCD communication encryption properties.

23. A method for providing security services, for securing the privacy of cellular network subscribers and the security of data stored on the said subscribers' User Cellular Devices (UCDs), said method implemented by one or more processors operatively coupled to a non-transitory computer readable storage device, on which are stored modules of instruction code that when executed cause the one or more processors to perform:
interfacing a cellular Public Land Mobile Network (PLMN) hosting a plurality of cellular subscribers, with a Controlled Cellular Network (CCN);
providing security services to "serviced subscribers" by said CCN;
encapsulating communication between the UCDs of said serviced subscribers and hosting PLMN by said CCN, said communication including at least part of: control, signaling, SMS and data communications;
monitoring and analyzing parameters and characteristics of said encapsulated communication in real time or in relation to historically acquired data by the CCN, said parameters and characteristics including at least one of: time patterns, volumes, destination address, source address, content and context;
identifying by the CCN statistic deviations in said parameters and characteristics exceeding predefined thresholds, based on said analysis of said encapsulated communication;
identifying by the CCN occurrence of predefined suspicious events and scenarios, based on said analysis of said encapsulated communication;
identifying by the CCN security threats to the privacy of said serviced subscribers, and to the data stored on their UCDs, and determining said threats' category and probability, based on said analysis of encapsulated communication;
responding to said security threats in real time or in near-real time, and taking active measures to avert the said suspected threats, said active measures including at least one of: blocking or diverting communication, alerting serviced subscribers and/or system administrators, responding to system queries with altered data, and logging of suspicious events and scenarios;
wherein application of said active measures depends on the category of identified threat, the identified threat's probability, and the serviced subscriber's profile;
instantiating at least one controlled module, within the CCN, configured to complement the functionality of respective elements of the hosting cellular PLMN;
configuring said controlled modules by a security center module;
monitoring, analyzing and managing of the functionality of each of said controlled modules comprising the CCN by the said security center module;
providing an administrative interface, by means of an administrative module operatively coupled to said security center module, enabling an administrator to:
instantiate controlled modules of one or more CCNs;
configure the components of one or more CCNs to serve serviced subscribers of the hosting cellular PLMN;
present alerts regarding the functionality of the CCN and its components;
present alerts regarding the occurrence of events and scenarios within the hosting cellular PLMN; and
extract reports regarding the functionality of the CCN and events within the hosting cellular PLMN;
probing each of the said controlled modules within the CCN, and accumulating data regarding transactions, events and scenarios occurring on the hosing PLMN and data regarding communication between elements of the CCN and the hosting PLMN by a probe interface module;
propagating the data accumulated by the said probe interface module to a data analysis module;
analyzing by the said data analysis module parameters and characteristics of said encapsulated communication in real time or in near-real time, said parameters including at least one of: time patterns, volumes, destination address, source address, content and context;
analyzing statistic deviations in the values of said parameters and characteristics exceeding predefined thresholds by the said data analysis module;
analyzing accumulated historical data, pertaining to said parameters and characteristics of said encapsulated communication by the said data analysis module;
identifying the occurrence of predefined suspicious events and scenarios on the hosing PLMN based on said analysis by the data analysis module;
identifying security threats to the privacy of serviced subscribers and data stored on their UCD based on said analysis by the data analysis module;
emitting activity messages from the data analysis module to other controlled modules of the CCN to avert the said identified security threats, and/or emitting alert messages to said administrative module and/or UCD to notify against said identified security threats;
maintaining an events' database, withholding important events and scenarios that occurred within the CCN and/or hosting PLMN;
receiving activity messages from said data analysis module to a security action management module;
obtaining parameters of served subscriber's profile from a subscribers database;
commanding controlled modules by the security action management module, to carry out security actions as dictated by said activity messages from said data analysis module, and avert said identified security threats, said security actions depending on: category of identified threat, the identified threat's probability, and the serviced subscriber's profile;
maintaining a database of the security threats encountered during the activity of the CCN;
dynamically altering the value of one or more serviced subscribers' UCD identity parameters by an identity mediation module, said identity parameters including at least one of IMSI, IMEI, IMEISV, MSISDN, Ki, Kc, TMSI, PTMSI, TLLI, ESN;

communicating said alteration of identity parameter values from the identity mediation module (1700) to the ULM on the serviced subscribers' UCD through said Lifeline communication channel;

receiving said required alteration of identity parameter values by said ULM module through said lifeline communication channel;

propagating the required alteration of values of identity parameters stored on the Subscriber Identity Storage Element (SISE), to said SISE, said parameters including at least one of IMSI, Ki and Kc;

applying by said SISE the said required alteration of values of serviced subscribers' UCD identity parameters stored on the SISE, said parameters including at least one of IMSI, Ki and Kc;

applying by said ULM required changes to values of UCD identity parameters stored on the UCD; and dynamically mediating between said altered UCD identity parameter values and the original UCD identity parameters by said identity mediation module, thus facilitating the routing of the UCD communication with the hosting PLMN or visited network using the altered identity parameters.

24. The method of claim 23, further comprising the step of invoking said alteration of one or more UCD identity parameter values according to at least one of the following configurations:

according to a time based trigger;

locally on the UCD, according to any logic preconfigured on the ULM or SISE;

locally by the ULM or SISE, in response to a failure to receive Lifeline communication;

remotely, according to any logic preconfigured on the identity mediation module;

remotely by the identity mediation module, in response to failure to receive Lifeline communication;

remotely by the identity mediation module, in response to an event on the hosting PLMN;

remotely by the identity mediation module, in response to an activity message from the data analysis module, following an identified suspected threat, including IMSI catcher and Man-in-the-Middle (MitM) attacks; or any combination of the above.

25. The method of claim 23, further comprising the steps of:

configuring the serviced subscribers' ULMs to possess a set of fallback identity parameter values; and upon the event of a lifeline communication failure between the security action module and the ULM of a serviced subscriber's UCD, the ULM will invoke alteration of UCD identity parameter values to said set of fallback values;

reverting to using said set of fallback identity parameter values by the UCD, thus re-introduced the UCD to the CCN, bearing the said fallback UCD identity parameter values;

optionally invoking a UCD restart by the ULM, in cases that require such a restart order to ensure the enforcement of said alteration of identity parameter values on the UCD.

* * * * *